US008422399B2

(12) United States Patent
Gorman

(10) Patent No.: US 8,422,399 B2
(45) Date of Patent: *Apr. 16, 2013

(54) SYSTEM AND METHOD OF MAPPING AND ANALYZING VULNERABILITIES IN NETWORKS

(75) Inventor: Sean P. Gorman, Arlington, VA (US)

(73) Assignee: Fortiusone, Inc., Arlington, VA (US)

( * ) Notice: Subject to any disclaimer, the term of this patent is extended or adjusted under 35 U.S.C. 154(b) by 915 days.

This patent is subject to a terminal disclaimer.

(21) Appl. No.: 12/411,958

(22) Filed: Mar. 26, 2009

(65) Prior Publication Data

US 2009/0238100 A1 Sep. 24, 2009

Related U.S. Application Data

(63) Continuation of application No. 10/902,283, filed on Jul. 30, 2004, now Pat. No. 7,529,195.

(51) Int. Cl.
*H04L 12/28* (2006.01)
(52) U.S. Cl.
USPC .............................................. 370/254; 726/25
(58) Field of Classification Search .................. 370/254; 709/224; 703/10, 11, 16; 726/25
See application file for complete search history.

(56) References Cited

U.S. PATENT DOCUMENTS

| 5,355,442 | A | 10/1994 | Paglieroni et al. |
|---|---|---|---|
| 5,781,704 | A | 7/1998 | Rossmo |
| 6,084,989 | A | 7/2000 | Eppler |
| 6,421,668 | B1 | 7/2002 | Yakhini et al. |
| 6,424,933 | B1 | 7/2002 | Agrawala |
| 6,868,421 | B1 | 3/2005 | Lin |
| 6,907,392 | B2 | 6/2005 | Bennis et al. |
| 6,915,211 | B2 | 7/2005 | Kram et al. |
| 6,952,661 | B2 | 10/2005 | Agrawala |
| 6,985,929 | B1 | 1/2006 | Wilson et al. |
| 7,035,933 | B2 | 4/2006 | O'Neal et al. |
| 7,062,084 | B2 | 6/2006 | Messing et al. |
| 7,120,620 | B2 | 10/2006 | Dumas et al. |
| 7,152,105 | B2 | 12/2006 | McClure et al. |
| 7,177,882 | B2 | 2/2007 | Xie et al. |
| 7,180,516 | B2 | 2/2007 | Kapler et al. |
| 7,181,406 | B1 | 2/2007 | Modest |
| 7,330,787 | B2 | 2/2008 | Agrawala |
| 7,400,770 | B2 | 7/2008 | Keaton |

(Continued)

FOREIGN PATENT DOCUMENTS

| WO | WO 00/70463 | 11/2000 |
|---|---|---|
| WO | WO 01/59989 | 8/2001 |
| WO | WO 2009/137126 | 11/2009 |

OTHER PUBLICATIONS

John D. Nystuen et al., "A Graph Theory Interpretation of Nodal Regions", Papers and Proceedings of the Regional Science Association, vol. 7, pp. 29-42 (1961).

(Continued)

*Primary Examiner* — Brenda H Pham
(74) *Attorney, Agent, or Firm* — DLA Piper LLP US

(57) ABSTRACT

Systems and methods for mapping and analyzing vulnerabilities in networks. In one embodiment, a network is mapped, comprising: converting network line data into point data; associating the point data with cells of a grid overlaying the network; and analyzing the network by determining the relationship of the point data to the cells of the grid.

21 Claims, 21 Drawing Sheets

U.S. PATENT DOCUMENTS

| | | | |
|---|---|---|---|
| 7,467,147 | B2 | 12/2008 | Irish et al. |
| 7,529,195 | B2 * | 5/2009 | Gorman .................. 370/254 |
| 7,664,298 | B2 | 2/2010 | Lang |
| 7,778,808 | B2 | 8/2010 | Miller et al. |
| 7,822,426 | B1 | 10/2010 | Wuersch |
| 7,965,902 | B1 | 6/2011 | Zelinka |
| 7,983,474 | B2 | 7/2011 | Van Workum et al. |
| 8,018,458 | B2 | 9/2011 | Peterson |
| 8,060,582 | B2 | 11/2011 | Bliss et al. |
| 2001/0048435 | A1 | 12/2001 | Deering et al. |
| 2002/0072993 | A1 | 6/2002 | Sandus et al. |
| 2002/0112232 | A1 | 8/2002 | Ream et al. |
| 2002/0112237 | A1 | 8/2002 | Kelts |
| 2003/0061211 | A1 | 3/2003 | Shultz et al. |
| 2003/0090485 | A1 | 5/2003 | Snuffer |
| 2003/0197877 | A1 | 10/2003 | Lee |
| 2003/0231174 | A1 | 12/2003 | Matusik et al. |
| 2004/0239681 | A1 | 12/2004 | Robotham |
| 2005/0100220 | A1 | 5/2005 | Keaton |
| 2005/0187711 | A1 | 8/2005 | Agrawala |
| 2005/0193430 | A1 | 9/2005 | Cohen et al. |
| 2005/0278386 | A1 | 12/2005 | Kelly et al. |
| 2005/0283525 | A1 | 12/2005 | O'Neal et al. |
| 2006/0026170 | A1 | 2/2006 | Kreitler et al. |
| 2006/0078205 | A1 | 4/2006 | Porikli et al. |
| 2006/0085419 | A1 | 4/2006 | Rosen |
| 2006/0136127 | A1 | 6/2006 | Coch et al. |
| 2006/0229058 | A1 | 10/2006 | Rosenberg |
| 2007/0168370 | A1 | 7/2007 | Hardy |
| 2007/0171716 | A1 | 7/2007 | Wright et al. |
| 2007/0218900 | A1 | 9/2007 | Abhyanker |
| 2007/0263007 | A1 | 11/2007 | Robotham |
| 2008/0086464 | A1 | 4/2008 | Enga |
| 2009/0132469 | A1 | 5/2009 | White et al. |
| 2010/0085350 | A1 | 4/2010 | Mishra et al. |
| 2011/0191284 | A1 | 8/2011 | Dalton |
| 2011/0316854 | A1 | 12/2011 | Vandrovec |

OTHER PUBLICATIONS

European Search Report issued in EP 07 84 2124, dated Jul. 8, 2011.
Markus Neteler et al., "Open Source GIS: A Grass GIS Approach: Second Edition", Kluwer Academic Publishers, Boston, pp. 54-130, 151-183, and 234-239 (2004).
Andrew Nelson, "Analysing Data Across Geographic Scales in Honduras: Detecting Levels of Organisation Within Systems", Agriculture, Ecosystems and Environment, vol. 85, pp. 107-131 (2001).
File History of U.S. App. No. 12/791,320.
File History of U.S. Appl. No. 12/030,028.
File History of U.S. Appl. No. 10/902,283.
File History of U.S. Appl. No. 10/902,416.
File History of U.S. Appl. No. 11/898,198.
File History of U.S. Appl. No. 12/791,320.
File History of U.S. Appl. No. 12/030,028, for May 2, 2011 to May 14, 2012.
File History of U.S. Appl. No. 12/791,320, for Oct. 24, 2011 to May 14, 2012.
Shashi Shekhar et al., "Spatial Contextual Classification and Prediction Models for Mining Geospatial Data", IEEE Transactions on Multimedia. vol. 4, No. 2, pp. 174-188 (Jun. 2002).
International Preliminary Report on Patentability issued in International Patent Application No. PCT/US2007/077985, mailed Mar. 19, 2009.
International Preliminary Report on Patentability issued in Application No. PCT/US08/053727 mailed Aug. 27, 2009.
Notice of Allowance of U.S. Appl. No. 10/902,416, mailed Sep. 24, 2009.
Tarboton, et al., "Advances in the mapping of flow networks from digital elevation data", Utal Water Research Laboratory, (May 20, 2001).
Pu, et al., "Routing Reliability Analysis of Partially Disjoint Paths", University of Victoria, Victoria, Canada.
Egenhofer, M.J., H. T. Bruns, "Visual Map Algebra: A Direct-Manipulation User Interface for GIS", IFIP Conference Proceedings 34, pp. 235-253, 1995.

D. Pullar, "MapScript: A Map Algebra Programming Language Incorporating Neighborhood Analysis," Geonformatica, vol. 5, pp. 145-163, 2001.
Adamic, L, 2000, "Zipf, Power- laws, and Pareto—a ranking tutorial" Internet Ecologies Area—Parc Xerox http://ginger.hpl.hp.com/shl/papers/ranking/ranking.html.
Albert R, Jeong H, Barabasi A, 1999, "The diameter of the World Wide Web" Nature 401: 130-131.
Albert R, Barabasi A, 2000, "Topology of evolving networks: Local Events and Universality" Physical Review Letters B5: (24) 5234-5237.
Albert R, Barabási, A, 2002, "Statistical mechanics of complex networks" Reviews of Modern Physics 74: 47-97.
Amaral L, Scala A, Barthelemy M, Stanley H, 2000, "Classes of small-world networks" Proceedings of the National Academy of Sciences 97 (21): 11149-11152.
Barabasi A, 2002, Linked: The New Science of Network. (Perseus Publishing, New York, NY).
Barabasi A, 2001, "The physics of the Web" Physics World Jul. 2001 http://www.physicsweb.org/article/world/14/7/09.
Barabasi A, Albert A, 1999, "Emergence of scaling in random networks" Science, Oct. 21, 1999.
Batty M, 2001, "Editorial: Cities as small worlds" Environment and Planning B: Planning and Design 28: 637-638.
Beaverstok JV, Smith RG, Taylor PJ, 2000, "World-City network: a new metageography?" Annals of the Association of American Geographer 90: 123-134 http://www.jstor.org/pss/1515383.
Bollobás B, 1985, Random Graphs. (Academic Press, New York).
Borgatti SP, Everett MG, Freeman LC, 2002, Ucinet for Windows: Software for Social Network Analysis. Harvard: Analytic Technologies http://www.analytictech.com/ucinet/ucinet_5_description.htm.
Cahn RS, 1999, Wide Area Networks: Concepts and Tools for Optimization. (San Francisco, CA: Morgan Kaufmann Publishers Inc.).
CAIDA (1998) "Mapnet: Macroscopic Internet Visualization and Measurement" CAIDA http://www.caida.org/tools/visualization/mapnet/.
Chen Q, Hyunseok C, Govindan R, Sugih J, Schenker S, Willinger W, "The origin of power laws in Internet topologies revisited," Proceedings of IEEE Infocom 2002.
Junho H. Choi et al., "Comparing World City Networks: A Network Analysis of Internet Backbone and Air Transport Intercity Linkages", Global Networks, vol. 6, No. 1, pp. 81-99 (2006).
Economist, 2001, "Drowning in glass" The Economist Mar. 22nd—http://www.economist.com/business/displayStory.cfm?Story_ID=540709.
Erdos P, Renyi A, 1960, On the evolution of random graphs. Publication of the Mathematical Institute of the Hungarian Academy of Science vol. 5 pp. 17-67.
Faloutsos C, Faloutsos P, Faloutsos M, 1999, "On Power-Law Relationships of the Internet Topology", Computer Communication Review.
Garrison W, 1968, "Connectivity of the interstate highway system" in Berry B, Marble D, 1968, Spatial Analysis. (Englewood Cliffs, NJ: Prentice Hall) pp. 239-249.
Gilder G, 2000, Telecosm. (New York: Free Press, 2000).
Gorman SP, Malecki EJ, 2000, "The networks of the Internet: an analysis of provider networks in the USA" Telecommunications Policy 24: 113-134 (2000).
Gorman, SP, Malecki EJ, "Fixed and Fluid: Stability and Change in the Geography of the Internet" Telecommunications Policy 26, 389-413 (2002).
Hayes B, 2000a, "Graph theory in practice: Part I" American Scientist 88 (01): 9-13 http://www.americanscientist.org/issues/num2/graph-theory-in-practice-part-i/1.
Hayes B, 2000b, "Graph theory in practice: Part II" American Scientist 88 (02): 104-109 http://www.americanscientist.org/issues/pub/graph-theory-in-practice-part-ii/1.
Huberman B, Adamic L, 1999, "Growth Dynamics of the World Wide Web" Nature 401:131-134.

Kansky K, 1963, *Structure of Transportation Networks: Relationships Between Network Geometry and Regional Characteristics.* (University of Chicago, Department of Geography, Research Papers).

Latora V, Marchiori M, 2002, "Is the Boston subway a small-world network?" *Physica A* 314:109-111.

Malecki EJ, 2002, "The Economic Geography of the Internet's Infrastructure," *Economic Geography*, vol. 78, No. 4, pp. 399-424.

Malecki EJ, Gorman SP, "Maybe the death of distance, but not the end of geography: the Internet as a network", in SD Brunn, TR Leinbach, (eds.) *The Worlds of Electronic Commerce*. (New York: John Wiley) pp. 87-105 (2001).

Milgram S, 1977, The small world problem. in *The Individual in a Social World: Essays and Experiments*, Milgrim, S, Sabini, J, (Eds) pp. 281-295. Reading, MA: Addison-Wesley.

Moss ML and Townsend A, 2000, "The Internet backbone and the American metropolis" *The Information Society* 16: 35-47.

Paltridge S, 2002, "Internet traffic exchange and the development of end-to-end international telecommunications competition" (OECD: Working Paper).

Radoslavov P, Tangmunarunkit H, Yu H, Govindan R, Schenker S, Estrin D, 2000, "On characterizing network topologies and analyzing their impact on protocol design" *Tech Report 00-731*, University of Southern California, Dept. of CS.

Seidman, S, 1983, "Internal cohesion of LS sets in graphs." *Social Networks* 5:97-107.

Simon HA, Bonini CP, 1958, "The size distribution of business firms" *The American Economic Review* 48: 607-617.

Stoneham, AKM, 1977, "The small-world problem in a spatial context" *Environment and Planning A* 9: 185-195.

Tangmunarunkit H, Govindan R, Jamin S, Schenker S, and Willinger W, 2001, "Network topologies, power laws, and hierarchy" *Tech Report* USC-CS-01-746—http://isi.edu/~hongsuda/pu... USCTech01_746.ps.

Telegeography, 2002, *Packet Geography 2002: Global Internet Statistics and Comments*. Telegeography Inc: 1909 K St., NW Suite 380 Washington, DC 20006 USA http://www.telegeography.com/products/books/pg/index.html.

Townsend A, 2001, "Network cities and the global structure of the Internet" *American Behavioral Scientist* 44 (10): 1697-1716.

Wasserman, S. and Faust, K., 1994, *Social Network Analysis: Methods and Applications* (Cambridge Univ. Press, Cambridge).

Watts DJ, Strogatz SH, 1998, "Collective dynamics of small-world networks" *Nature* 393: 440-442.

Watts DJ, *Small Worlds: The Dynamics of Networks between Order and Randomness* (Princeton University Press, Princeton, NJ) (1999).

Watts, DJ, 2003, *Six Degrees: The Science of a Connected Age* (W.W. Norton, New York, NY).

Yook SH, Jeong H, Barabási AL, 2001, "Modeling the Internet's Large-Scale Topology" http://xxx.lanl.gov/abs/cond-mat/0107417.

Zipf PK, *Human Behavior and the Principle of Least Effort*; Addison-Wesley, Cambridge, MA; pp. 445-516 (1949).

The White House: *The National Strategy to Secure Cyberspace.*

NRC, 2002, *Cybersecurity Today and Tomorrow: Pay Now or Pay Later* Washington, DC: National Academy Press.

NSTAC, 2002, *Network Security/Vulnerability Assessments Task Force Report* Washington, DC: The President's National Security Telecommunications Advisory Committee—http://www.ncs.gov/nstac/NSVATF-Report-(FINAL).htm.

Moore, D., Paxson, V., Savage, S., Colleen, S., Staniford, S., and Weaver, N. 2003, *The spread of the Sapphire/Slammer worm.* CAIDA—http://www.caida.org/outreach/papers/2003/sapphire/sapphire.html.

Callaway, D.S., Newman, M.E.J., Strogatz, S.H., and Watts, D.J., 2000, "Network robustness and fragility: percolation on random graphs.," *Physical Review Letters* 85 (25): 5468-5471.

Cohen, R., Erez, K., ben-Avraham, D., and Havlin, S., 2001 Breakdown of the Internet under intentional attack. *Physical Review Letters* 86:16.

Gorman, S.P. and Kulkarni, R., Spatial small worlds: New geographic patterns for an information economy. *Environment and Planning B: Planning and Design 2004*, vol. 31, pp. 273-296.

Gorman, S.P., Schintler, L.A., Kulkarni, R.G., and Stough, R.R., *The revenge of distance: Vulnerability analysis of critical information infrastructure.* in submission (2002).

Grubesic, T.H., O'Kelly, M.E., and Murray, A.T., (2003) A geographic perspective on telecommunication network survivability. *Telematics and Informatics* 20(1): 51-69.

Cliff A., Haggett P., and Ord K. Graph theory and geography. In: Wilson R. and Beineke L. (Eds) *Applications of graph theory*. London: Academic Press, pp. 293-326 (1979).

Lawyer, G., 2003, The battle of the bug: Government, industry move to protect Internet from cyber attacks, viruses. http://www.xchangemag.com/articles/1B1front4.html.

Pastor-Satorras, R., Vespignani, A., 2001, Epidemic dynamics and endemic states in complex networks. *Physical Review!* E 63: 066117.

Moreno, Y., Vazquez, A., 2003, *Disease spreading in structured scale free network.* The European Physical Journal B 31:265-271.

Dezsos, A., Barabasi, A.L., 2002, *Halting viruses in scale-free networks.* Physical Review E 65:055103 (R).

Newman, M.E.J., Forest, S., and Balthrop, J., 2002, Email networks and the spread of computer viruses. *Physical Review* E 66: 035101(R).

Hunker, J., 2002, Policy challenges in building dependability in global infrastructures. *Computers & Security* 21 (8): 705-711.

Dinc M., Haynes K.E., Stough R.R., and Yilmaz S., 1998, Regional universal telecommunication service provisions in the US—Efficiency versus penetration. *Telecommunications Policy* 22 (6): 541-553.

Tarjanne, P., 1999, Preparing for the next revolution in telecommunications: implementing the WTO agreements Policy 22(6): 541-553.

Pastor-Satorras, R., and Vespignani, A., 2002, Immunization of complex networks. *Physical Review E* 65:036104-1.

Moore, D., Shannon, C., Voelker, G.M., and Savage, S., 2003, *Internet quarantine: Requirements for containing self-propagating code.* INFOCOM 2003 http://www.caida.org/outreach/papers/2003/quarantine/.

Atkinson, R. (1998) "Technological Change and Cities.," *Cityscape: A Journal of Policy Development and Research* 3 (3): 129-170.

Bhandari, R. (1999) *Survivable Networks: Algorithms for Diverse Routing.* Boston: Kluwer Academic Press.

Brunn, S D. and Leinbach, T R. (1991) *Collapsing Space & Time: Geographic Aspects of Communication & Information.* New York: Harper Collins Academic.

Cairncross, F. (1997) *The Death of Distance.* Boston: Harvard Business School Press.

Castells, M. (1989) *The Informational City.* Oxford, UK Blackwell.

Falk, T., Abler, R. (1980) Intercommunications, Distance, and Geographical Theory. *Geografiska Annaler*, Series B, 62: 35-56.

Gillespie, A. and Robins, K. (1989) Geographical Inequalities: The Spatial Bias of the New Communications Technologies. *Journal of Communications* 39 (3): 7-18.

Kunreuther, H., Heal, G. and Orszag, P. (2002), "Interdependent Security: Implications for Homeland Security Policy and Other Areas," *The Brookings Institute*, Policy Brief #108.

Lowe, J. and Moryadas, S. (1975) *The Geography of Movement* Prospect Heights, IL: Waveland Press.

Malecki, E.J.; The Internet Age: Not the End of Geography, in D. Felsenstein and M.J. Taylor, eds. *Promoting Local Growth: Process, Practice and Policy*. Aldershot: Ashgate, 2001, pp. 227-253.

Malecki, E.J. (2002) The Internet: A preliminary analysis of its evolving economic geography, *Economic Geography*, vol. 78, No. 4, pp. 399-424.

Medina, A., Matta, I., and Byers, J. (2000) On the origin of power-laws in Internet topologies. *ACM Computer Communications Review* 30(2).

Moss, M.L. and Townsend, A. (1997) Tracking the net: using domain names to measure the growth of the Internet in US cities. *Journal of Urban Technology* 4(3): 47-60.

Negroponte, N. (1995) *Being Digital.* New York: Alfred A. Knopf.

Pansiot, J. and Grad, D. (1998) On routes and multicast trees in the Internet. *ACM SIGCOMM Computer Communications Review* 28(1): 41-50.

Paxson, V. (1996) End-to-end routing behavior in the Internet. *Proceedings of the ACM SIGCOMM 96'* Sept: 25-38.

Redner, S. (1998) How popular is your paper? An empirical study of the citation distribution. *European Physical Journal B* 4: 131-134.

Yasin, R.; Gov't to map infrastructure. Internetweek.com http://www.internetweek.com/story/INW20011206S0001 (2001).

Schintler, L., Kulkarni, R., Gorman, S.P., and Stough, R.; Power and Packets: A Spatial network Comparison of the US Electric Power Grid and Internet Network, pp. 35-60 (2004).

Amin, M, 2001, "Toward self-healing energy infrastructure systems," *IEEE Computer Applications in Power* 14(1): 20-28.

Berry B, Marble D, 1968, *Spatial Analysis*. Englewood Cliffs, NJ: Prentice Hall.

Christaller, W. (1933) *Central Places in Southern Germany*. Jena, Germany: Fischer (English Translation by C.W. Baskin, London: Prentice Hall, 1966).

Collins J, 2002, "Dominant Cisco Grows router market share" *Personal Computer World* http://www.pcw.co.uk/News/1131853.

Elmes G, "The changing geography of electric energy in the United States—Retrospect and prospect" *Geography* 81 (4): 347-360 (1996).

FCC Network Outage Reporting System: User Manual, Nov. 30, 2004.

GAO Jan. 2003, "Critical infrastructure protection: Efforts of the financial services sector to address cyber threats", *Report to the Subcommittee on Domestic Monetary Policy, Technology, and Economic Growth, Committee on Financial Services, House of Representatives*.

Halsne C, 2003, "North Sound 911 Service Repeatedly Targeted" *KIRO TV* http://www.kirotv.com/news/2601577/detail.html.

Huitema C, 1995, *Routing in the Internet* Englewood, CA: Prentice Hall.

Knox PL, Taylor PJ, 1995, *World Cities in a World-System* New York: Cambridge University Press.

Langdale JV, 1989, "The geography of international business telecommunications: The role of leased networks" *Annals of the Association of American Geographers* 79(4): 501-522.

Lerten B, 2003, "Tower saboteur: I was only pointing out flaws" *The Bend Bugle* Nov. 23 http://bend.com/news/ar_view3Far_id3D12260.htm.

Leyshon A, 1996, "Financial exclusion and the shifting boundaries of the financial system" *Environment and Planning A* 28(7): 1150-1156.

Lindstron A, "Tunnel Vision?" Broadbandweek.com http://www.broadbandweek.com/news/010806/010806_news_fiber. htm (2001).

Longcore T, Rees P, 1996, "Information technology and downtown restructuring: The case of New York City's financial district" *Urban Geography* 17: 354-372 Maine PUC, 2003, http://www.state.me.us/mpuc/misctranscripts/2002-43%20080503.htm.

Moss, M. (1998) Technologies and Cities. *Cityscape: A Journal of Policy Development and Research* 3: 107-127.

Neuman P, 1991, "NY area fiber-optic telephone cable severed; extensive effects" *The Risk Digest 10:75* http://catless.ncl.ac.uk/Risks/10.75html#subj1.

Neuman P, 2000, "Week-long outage after cable cut downs 11,000 phone lines" *The Risk Digest* 20:84 http://catless.ncl.ac.uk/Risks/20.84html#subj6.1.

Neuman R, 2002, "Wall street worries" *U.S. News & World Reports* Sep. 23.

NIST, 1995, *The Impact of the FCC's Open Network Architecture on NS/NP Telecommunications Security* Washington DC: National Institute of Standards and Technology http://csrc.nist.gov/publications/nistpubs/800-11/titleona.html.

Nyusten JD, Dacey MF, 1968, A graph theory interpretation of nodal regions. In Berry B, Marble, D, 1968, *Spatial Analysis* Englewood Cliffs, NJ: Prentice Hall 407-418.

O'Kelly ME, Grubesic TH, (2002) Backbone topology, access, and the commercial Internet, 1997-2000. *Environmental and Planning B* 29(4): 533-552.

PSERC, 2003, "Public Utilities Commission of Ohio, sequence of events on Aug. 14, 2003" http://www.pserc.wisc.edu/Ohio_Only_Sequence_of_Events.pdf.

Cowie, et al., Impact of the 2003 Blackouts on Internet Communication: Preliminary Report, Nov. 21, 2003 (21 pages).

Taaffe, E.J. and Gauthier, H.L. (1973) *Geography of Transportation* Englewood Cliffs, NJ: Prentice Hall.

Warf B, 1995, "Telecommunications and the changing geographies of knowledge transmission in the late 20th century" *Urban Studies* 32(2): 361-378.

Wheeler DC, O'Kelly ME, 1999, "Network topology and city accessibility of the commercial Internet" *Professional Geographer* 51: 327-339.

Malecki, EJ, "Fibre tracks: explaining investment in fibre optic backbones" *Entrepreneurship & Regional Development*, 16, Jan. 2004, 21-39.

Evans-Cowley, J, Malecki, EJ, and McIntee, A 2002, "Planning Responses to Telecom Hotels: What Accounts for Increased Regulation of Co-location Facilities?", *Journal of Urban Technology*, vol. 9, No. 3, pp. 1-18.

International Search Report issued in Application No. PCT/US2005/026752 mailed Dec. 22, 2006.

Written Opinion issued in Application No. PCT/US2005/026752 mailed Dec. 22, 2006.

International Preliminary Report on Patentability issued in Application No. PCT/US2005/026752 mailed Dec. 22, 2006.

Office Action issued in U.S. Appl. No. 10/902,416 mailed. Dec. 16, 2008.

Odlyzko, A.M., "Comments on the Larry Roberts and Caspian Networks Study of Internet Traffic Growth", The Cook Report on the Internet, (2001) pp. 12-15.

Notice of Allowance issued in U.S. Appl. No. 10/902,283 mailed Dec. 30, 2008.

Pallas R. et al.: "A pragmatic approach to debris flow hazard mapping in areas affected by Hurricane Mitch: example from NW Nicaragua", Engineering Geology, Elsevier Science Publishers, Amsterdam, NL. vol. 72, No. 1.2, Mar. 1, 2004, pp. 57-72.

European Search Report issued in Application No. 05777205.5 mailed Dec. 23, 2008.

Notice of Allowance of U.S. Appl. No. 10/902,416, mailed Mar. 5, 2010.

Ickjai Lee et al., "Polygonization of Point Clusters Through Cluster Boundary Extraction for Geographical Data Mining", Symposium on Geospatial Theory, Processing and Applications (2002) (14 Pages).

Shashi Shekhar et al., "Spatial Contextual Classification and Prediction Models for Mining Geospatial Data", IEEE Transactions on Multimedia, vol. 4, No. 2, pp. 174-188 (Jun. 2002).

Christopher Torpelund-Bruin et al., "Segmentation and Mapping of User-Driven Geospatial Web Data", 2010 6th International Conference on Advanced Information Management and Service (IMS), pp. 73-77 (2010).

File History of U.S. Appl. No. 11/898,198, for Jun. 28, 2010 to Aug. 22, 2012.

File History of U.S. Appl. No. 12/030,028, for May 14, 2012 to Aug. 22, 2012.

Tarboton, et al., "Advances in the mapping of flow networks from digital elevation data", Utal Water Research Laboratony, (May 20, 2001).

Gomes, et al., "An Algorithm for Calculating the K Most Reliable Disjoint Paths with a Maximum Number Of Arcs", University of Columbia, Portugal, (1998).

Albert, et al., "Error and attack tolerance of complex networks", Nature 406, 378-382 (2000).

Notice of Allowance issued in U.S. Appl. No. 10/902,283 mailed Jul. 18, 2008.

Egenhofer, M.J., H. T. Bruns, "Visual Map Algebra A Direct-Manipulation User Interface for GIS", IFIP Conference Proceedings 34, pp. 235-253, 1995.

Bruns, H. T. And Egenhofer, M.J. *User Interfaces for Map Algebra*, Journal of the Urban and Regional Information Systems Association, vol. 9, No. 1, pp. 44-54, 1997.

D. Puller, "MapScript: A Map Algebra Programming Language Incorporating Neighborhood Analysis", *Geonforrratica*, vol. 5, pp. 145-163, 2001.

International Search Report issued in Application No. PCT/US07/077985 mailed Mar. 12, 2008.

International Search Report issued in Application No. PCT/US08/053727 mailed Jul. 25, 2008.

Written Opinion issued in Application No. PCT/US07/077985 mailed Mar. 12, 2008.

Written Opinion issued in Application no. PCT/US08/053727 mailed Jul. 25, 2008.

Albert R, Barabasi A, 2000, "Topology of evolving networks: Local Events and Universality" *Physical Review Letters* 85: (24) 5234-5237.

Albert R, Barabasi, A, 2002, "Statistical mechanics of complex networks" *Reviews of Modern Physics* 74: 47-97.

Amaral L., Scala A, Barthelemy M, Stanley H, 2000, "Classes of small-world networks"*Proceedings of the National Academy of Sciences 97* (21): 11149-11152.

Arthur WB, 1999, "Complexity and the economy" *Science* 284: 107-109.

Gorman, SP, Malecki EJ, "Fixed and Fluid: Stability and Change in The Geography of the Internet" *Telecommunications Policy* 26. 389-413 (2002)

Gorman, SP and McIntee A, "Tethered connectivity? The spatial distribution of wireless infrastructure" *Environment and Planning A* 2003, vol. 35, pp. 1157-1171.

Haggett P, Chorley R, 1969, *Network Analysis in Geography*. (New York: St. Martins Press).

Huberman B, Adamic L, 1999 "Growth Dynamics of the World Wide Web" *Nature* 401:131-134.

Kansky K, 1963, *Structure of Transportation Networks: Relationships Between Network Geometry and Regional Characteristics*, (University Of Chicago, Department of Geography, Research Papers).

Lakhina, A, Byers, JW, Crovella, M, Matta, I, 2002, "On the Geographic Locations of Internet Resources" http://www.cs.bu.edu/techreports/pdf/2002-015-internetgeography.pdf.

Zipf PK. *Human Behavior and the Principle of Least Effort*; Addison-Wesley, Cambridge, MA: pp. 445-516 (1949).

Gao, L., 2001, On inferring autonomous system relationships in the Internet. *IEEE/ACM Transactions on networking* 9(6): 733.

NRC. 2002, *Cybersecurity Today and Tomorrow: Pay Now or Pay Later Washington*, DC: National Academy Press.

NSTAC, 2002, *Network Security/Vulnerability Assessments Task Force Report Washington, DC* . The President's National Security Telecommunications Advisory Committee—http://www.ncs.gov/nstac/NSVATF-Report-(FINAL).htm.

Moore, D., Paxson, V., Savage, S., Colleen, S., Staniford, S., and Weaver, N. 2003, *The spread of the Sepphire/Slammer worm*. CAIDA-http://www.caida.org/outreach/papers/2003/sapphire/sapphire.html Magoni, D. and Pansiot, J.J., 2001, Analysis of the Autonomous system network topology. *Proceedings of ACM SIgcomm'01*.

Callaway, D.S , Newman, M.E.J., Strogatz, S.H., and Watts, D.J., 2000, "Network robustness and fragility: percolation on random graphs.," *Physical Review Letters* 85 (25): 5468-5471.

Cohen, R., Erez, K., ben-Avraham, D., and Haviin, S., 2001 Breakdown of the Internet under intentional attack *Physical Review Letters* 86:16.

Hayes, B., "Graph theory in practice: Part I" *American Scientist*, vol. 88, No. 1, pp. 9-13. Jan. 2000 http://www.americanscientist.org/issues/num2/graph-theory-in-practice-part-i/1.

Hayes, B., "Graph theory in practice: Part II" *American Scientist*, vol. 88, No. 2, pp. 104-109. Mar. 2000 http://www.americanscientist.org/issues/pub/graph-theory-in-practice-part-ii/1.

Albert R, Jeong H, Barabasi A, "The diameter of the World Wide Web" *Nature* 401: 130-131, Sep. 9, 1999.

Adamic, L., Oct. 4, 2000, "Zipf, Power-laws, and Pareto—a ranking tutorial" *Internet Ecologies Area—Parc Xerox* http://ginger.hpl.hp.com/shl/papers/ranking/ranking.html.

The White House: *The National Strategy to Secure Cyberspace*, Feb. 2003.

Pu, et al., "Routing Reliability Analysis of Partially Disjoint Paths", IEEE Pacific Rim Conference one Communications, Computers and Signal Processing (PACRIM), (2001).

\* cited by examiner

FIGURE 2

| Cell | Attribute (i.e. number of points) |
|---|---|
| 1 | 0 |
| 2 | 12 |
| 3 | 23 |
| 4 | 0 |
| 5 | 6 |

FIGURE 5

| Cell # | Point Count |
|---|---|
| 1 | 3 |
| 2 | 2 |
| 3 | 2 |
| 4 | 1 |
| 5 | 2 |
| 6 | 1 |
| 7 | 1 |
| 8 | 2 |
| 9 | 1 |
| 10 | 1 |
| 11 | 1 |
| 12 | 5 |
| 13 | 0 |
| 14 | 0 |

FIGURE 12

|    | 1 | 2 | 3 | 4 | 5 | 6 | 7 | 8 | 9 | 10 | 11 | 12 | 13 | 14 | 15 | 16 | 17 | 18 | 19 | 20 | 21 | 22 | 23 | 24 | 25 | 26 | 27 | 28 | 29 | 30 | 31 | 32 | 33 | 34 | 35 |
|----|---|---|---|---|---|---|---|---|---|----|----|----|----|----|----|----|----|----|----|----|----|----|----|----|----|----|----|----|----|----|----|----|----|----|----|
| 1  | 1 | 1 | 0 | 0 | 0 | 1 | 0 | 0 | 0 | 0  | 0  | 0  | 0  | 0  | 0  | 0  | 0  | 0  | 0  | 0  | 0  | 0  | 0  | 0  | 0  | 0  | 0  | 0  | 0  | 0  | 0  | 0  | 0  | 0  | 0  |
| 2  | 1 | 1 | 1 | 0 | 0 | 1 | 0 | 0 | 0 | 0  | 0  | 0  | 0  | 0  | 0  | 0  | 0  | 0  | 0  | 0  | 0  | 0  | 0  | 0  | 0  | 0  | 0  | 0  | 0  | 0  | 0  | 0  | 0  | 0  | 0  |
| 3  | 0 | 1 | 1 | 1 | 0 | 0 | 1 | 0 | 0 | 0  | 0  | 0  | 0  | 0  | 0  | 0  | 0  | 0  | 0  | 0  | 0  | 0  | 0  | 0  | 0  | 0  | 0  | 0  | 0  | 0  | 0  | 0  | 0  | 0  | 0  |
| 4  | 0 | 0 | 1 | 1 | 1 | 0 | 1 | 1 | 0 | 0  | 0  | 0  | 0  | 0  | 0  | 0  | 0  | 0  | 0  | 0  | 0  | 0  | 0  | 0  | 0  | 0  | 0  | 0  | 0  | 0  | 0  | 0  | 0  | 0  | 0  |
| 5  | 0 | 0 | 0 | 1 | 1 | 0 | 0 | 1 | 0 | 0  | 0  | 0  | 0  | 0  | 0  | 0  | 0  | 0  | 0  | 0  | 0  | 0  | 0  | 0  | 0  | 0  | 0  | 0  | 0  | 0  | 0  | 0  | 0  | 0  | 0  |
| 6  | 1 | 1 | 0 | 0 | 0 | 1 | 0 | 0 | 1 | 1  | 1  | 0  | 0  | 0  | 0  | 0  | 0  | 0  | 0  | 0  | 0  | 0  | 0  | 0  | 0  | 0  | 0  | 0  | 0  | 0  | 0  | 0  | 0  | 0  | 0  |
| 7  | 0 | 1 | 1 | 1 | 0 | 0 | 1 | 0 | 0 | 1  | 1  | 0  | 0  | 0  | 0  | 0  | 0  | 0  | 0  | 0  | 0  | 0  | 0  | 0  | 0  | 0  | 0  | 0  | 0  | 0  | 0  | 0  | 0  | 0  | 0  |
| 8  | 0 | 0 | 0 | 1 | 1 | 0 | 0 | 1 | 0 | 0  | 0  | 1  | 0  | 0  | 0  | 0  | 0  | 0  | 0  | 0  | 0  | 0  | 0  | 0  | 0  | 0  | 0  | 0  | 0  | 0  | 0  | 0  | 0  | 0  | 0  |
| 9  | 0 | 0 | 0 | 0 | 0 | 0 | 0 | 0 | 1 | 1  | 0  | 0  | 0  | 1  | 0  | 0  | 0  | 0  | 0  | 0  | 0  | 0  | 0  | 0  | 0  | 0  | 0  | 0  | 0  | 0  | 0  | 0  | 0  | 0  | 0  |
| 10 | 0 | 0 | 0 | 0 | 0 | 1 | 0 | 0 | 1 | 1  | 1  | 0  | 0  | 1  | 1  | 0  | 0  | 0  | 0  | 0  | 0  | 0  | 0  | 0  | 0  | 0  | 0  | 0  | 0  | 0  | 0  | 0  | 0  | 0  | 0  |
| 11 | 0 | 0 | 0 | 0 | 0 | 1 | 1 | 0 | 0 | 1  | 1  | 1  | 0  | 0  | 1  | 0  | 0  | 0  | 0  | 0  | 0  | 0  | 0  | 0  | 0  | 0  | 0  | 0  | 0  | 0  | 0  | 0  | 0  | 0  | 0  |
| 12 | 0 | 0 | 0 | 0 | 0 | 0 | 1 | 0 | 0 | 0  | 1  | 1  | 0  | 0  | 1  | 0  | 0  | 0  | 0  | 0  | 0  | 0  | 0  | 0  | 0  | 0  | 0  | 0  | 0  | 0  | 0  | 0  | 0  | 0  | 0  |
| 13 | 0 | 0 | 0 | 0 | 0 | 0 | 0 | 1 | 0 | 0  | 0  | 0  | 1  | 0  | 0  | 0  | 0  | 0  | 0  | 0  | 0  | 0  | 0  | 0  | 0  | 0  | 0  | 0  | 0  | 0  | 0  | 0  | 0  | 0  | 0  |
| 14 | 0 | 0 | 0 | 0 | 0 | 0 | 0 | 0 | 1 | 1  | 0  | 0  | 0  | 1  | 0  | 1  | 1  | 0  | 0  | 0  | 0  | 0  | 0  | 0  | 0  | 0  | 0  | 0  | 0  | 0  | 0  | 0  | 0  | 0  | 0  |
| 15 | 0 | 0 | 0 | 0 | 0 | 0 | 0 | 0 | 1 | 1  | 1  | 0  | 0  | 1  | 0  | 1  | 1  | 0  | 0  | 0  | 0  | 0  | 0  | 0  | 0  | 0  | 0  | 0  | 0  | 0  | 0  | 0  | 0  | 0  | 0  |
| 16 | 0 | 0 | 0 | 0 | 0 | 0 | 0 | 0 | 0 | 0  | 0  | 0  | 1  | 0  | 1  | 1  | 0  | 1  | 1  | 0  | 0  | 0  | 0  | 0  | 0  | 0  | 0  | 0  | 0  | 0  | 0  | 0  | 0  | 0  | 0  |
| 17 | 0 | 0 | 0 | 0 | 0 | 0 | 0 | 0 | 0 | 0  | 0  | 0  | 0  | 0  | 1  | 1  | 1  | 0  | 1  | 1  | 0  | 0  | 0  | 0  | 0  | 0  | 0  | 0  | 0  | 0  | 0  | 0  | 0  | 0  | 0  |
| 18 | 0 | 0 | 0 | 0 | 0 | 0 | 0 | 0 | 0 | 0  | 0  | 0  | 0  | 0  | 1  | 0  | 1  | 1  | 0  | 0  | 1  | 0  | 0  | 0  | 0  | 0  | 0  | 0  | 0  | 0  | 0  | 0  | 0  | 0  | 0  |
| 19 | 0 | 0 | 0 | 0 | 0 | 0 | 0 | 0 | 0 | 0  | 0  | 0  | 0  | 0  | 0  | 1  | 0  | 0  | 1  | 1  | 0  | 1  | 0  | 1  | 0  | 0  | 0  | 0  | 0  | 0  | 0  | 0  | 0  | 0  | 0  |
| 20 | 0 | 0 | 0 | 0 | 0 | 0 | 0 | 0 | 0 | 0  | 0  | 0  | 0  | 0  | 0  | 1  | 1  | 0  | 1  | 0  | 1  | 1  | 1  | 0  | 0  | 0  | 0  | 0  | 0  | 0  | 0  | 0  | 0  | 0  | 0  |
| 21 | 0 | 0 | 0 | 0 | 0 | 0 | 0 | 0 | 0 | 0  | 0  | 0  | 0  | 0  | 0  | 1  | 1  | 0  | 0  | 1  | 0  | 0  | 1  | 0  | 0  | 0  | 0  | 0  | 0  | 0  | 0  | 0  | 0  | 0  | 0  |
| 22 | 0 | 0 | 0 | 0 | 0 | 0 | 0 | 0 | 0 | 0  | 0  | 0  | 0  | 0  | 0  | 0  | 1  | 1  | 0  | 1  | 1  | 0  | 1  | 0  | 0  | 0  | 0  | 0  | 0  | 0  | 0  | 0  | 0  | 0  | 0  |
| 23 | 0 | 0 | 0 | 0 | 0 | 0 | 0 | 0 | 0 | 0  | 0  | 0  | 0  | 0  | 0  | 0  | 1  | 1  | 0  | 1  | 1  | 0  | 1  | 0  | 0  | 0  | 0  | 0  | 0  | 0  | 0  | 0  | 0  | 0  | 0  |
| 24 | 0 | 0 | 0 | 0 | 0 | 0 | 0 | 0 | 0 | 0  | 0  | 0  | 0  | 0  | 0  | 0  | 0  | 0  | 1  | 0  | 0  | 1  | 0  | 1  | 0  | 0  | 0  | 0  | 0  | 0  | 0  | 0  | 0  | 0  | 0  |
| 25 | 0 | 0 | 0 | 0 | 0 | 0 | 0 | 0 | 0 | 0  | 0  | 0  | 0  | 0  | 0  | 0  | 0  | 0  | 0  | 0  | 1  | 1  | 0  | 1  | 0  | 0  | 0  | 1  | 0  | 0  | 0  | 0  | 0  | 0  | 0  |
| 26 | 0 | 0 | 0 | 0 | 0 | 0 | 0 | 0 | 0 | 0  | 0  | 0  | 0  | 0  | 0  | 0  | 0  | 0  | 0  | 0  | 0  | 1  | 0  | 1  | 1  | 0  | 0  | 0  | 0  | 0  | 0  | 0  | 0  | 0  | 0  |
| 27 | 0 | 0 | 0 | 0 | 0 | 0 | 0 | 0 | 0 | 0  | 0  | 0  | 0  | 0  | 0  | 0  | 0  | 0  | 0  | 0  | 0  | 0  | 1  | 1  | 1  | 0  | 1  | 1  | 1  | 0  | 0  | 0  | 0  | 0  | 0  |
| 28 | 0 | 0 | 0 | 0 | 0 | 0 | 0 | 0 | 0 | 0  | 0  | 0  | 0  | 0  | 0  | 0  | 0  | 0  | 0  | 0  | 0  | 0  | 0  | 1  | 1  | 0  | 0  | 1  | 1  | 0  | 0  | 0  | 0  | 0  | 0  |
| 29 | 0 | 0 | 0 | 0 | 0 | 0 | 0 | 0 | 0 | 0  | 0  | 0  | 0  | 0  | 0  | 0  | 0  | 0  | 0  | 0  | 0  | 0  | 0  | 0  | 1  | 0  | 0  | 0  | 1  | 0  | 0  | 0  | 1  | 1  | 0  |
| 30 | 0 | 0 | 0 | 0 | 0 | 0 | 0 | 0 | 0 | 0  | 0  | 0  | 0  | 0  | 0  | 0  | 0  | 0  | 0  | 0  | 0  | 0  | 0  | 0  | 1  | 1  | 0  | 0  | 1  | 1  | 0  | 0  | 0  | 0  | 0  |
| 31 | 0 | 0 | 0 | 0 | 0 | 0 | 0 | 0 | 0 | 0  | 0  | 0  | 0  | 0  | 0  | 0  | 0  | 0  | 0  | 0  | 0  | 0  | 0  | 0  | 0  | 1  | 1  | 1  | 0  | 1  | 1  | 1  | 0  | 0  | 1  |
| 32 | 0 | 0 | 0 | 0 | 0 | 0 | 0 | 0 | 0 | 0  | 0  | 0  | 0  | 0  | 0  | 0  | 0  | 0  | 0  | 0  | 0  | 0  | 0  | 0  | 0  | 1  | 1  | 0  | 0  | 1  | 1  | 0  | 0  | 0  | 1  |
| 33 | 0 | 0 | 0 | 0 | 0 | 0 | 0 | 0 | 0 | 0  | 0  | 0  | 0  | 0  | 0  | 0  | 0  | 0  | 0  | 0  | 0  | 0  | 0  | 0  | 0  | 0  | 0  | 0  | 1  | 0  | 0  | 0  | 1  | 1  | 0  |
| 34 | 0 | 0 | 0 | 0 | 0 | 0 | 0 | 0 | 0 | 0  | 0  | 0  | 0  | 0  | 0  | 0  | 0  | 0  | 0  | 0  | 0  | 0  | 0  | 0  | 0  | 0  | 0  | 0  | 1  | 0  | 0  | 0  | 1  | 1  | 0  |
| 35 | 0 | 0 | 0 | 0 | 0 | 0 | 0 | 0 | 0 | 0  | 0  | 0  | 0  | 0  | 0  | 0  | 0  | 0  | 0  | 0  | 0  | 0  | 0  | 0  | 0  | 0  | 0  | 0  | 0  | 0  | 1  | 1  | 0  | 0  | 1  |

FIGURE 14

SYSTEM AND METHOD OF MAPPING AND ANALYZING VULNERABILITIES IN NETWORKS

RELATED APPLICATIONS

This application is a continuation of U.S. patent application Ser. No. 10/902,283, filed Jul. 30, 2004, now U.S. Pat. No. 7,529,195 the disclosure of which is incorporated by reference in its entirety.

FIELD OF THE INVENTION

The present invention relates to mapping and analyzing vulnerability in networks.

BRIEF DESCRIPTION OF THE FIGURES

FIG. 2 illustrates an example of a grid with attribute information, according to one embodiment of the invention.

FIGS. 4-5 illustrate examples of the method for mapping and analyzing a network, according to one embodiment of the present invention.

FIGS. 12-13 illustrate examples of a choke point analysis, according to one embodiment of the present invention.

FIGS. 14-16 illustrate examples of a cell disjoint path analysis, according to one embodiment of the present invention.

DESCRIPTION OF SEVERAL EMBODIMENTS OF THE INVENTION

System

Figure 1:
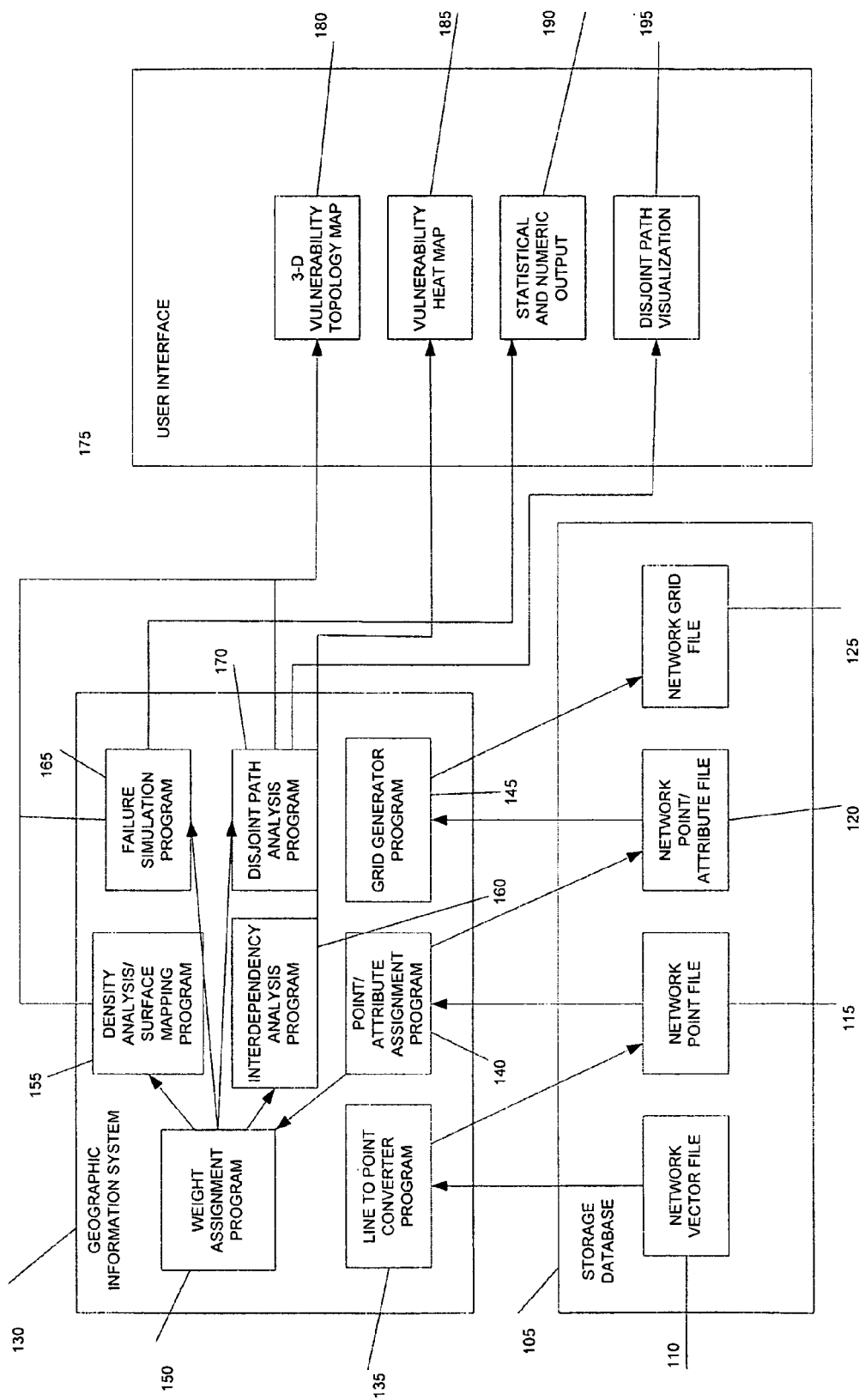
FIG. 1 illustrates a system for mapping and analyzing a network, according to one embodiment of the present invention.

FIG. 1 illustrates a system. for mapping and analyzing a network, according to one embodiment of the present invention. The system includes a storage database 105, which includes the following: a network line file 10, storing line data from a spatial network; a network point file 115, storing network data that has been converted into points; a network point/attribute file 120, storing network point data including attribute information assigned to points; and a network grid file 125, storing point data associated with grid information. For example, the grid could be stored with attributes for each cell based on the point data in each cell, as illustrated in FIG. 2.

The system also includes a geographic information system (GIS) 130, which includes a line to point converter program 135, a point/attribute assignment program 140, a grid generator program 145, and a weight assignment program 150. Furthermore, the GIS 130 can include: a density analysis/surface mapping program 155, an interdependency analysis program 160, a failure simulation program 165, or a disjoint path analysis program 170, or any combination thereof. The system can use any GIS platform, including open source GIS systems to uniquely combine algorithms, scripts, and processes to an analytic output. The line to point converter program 135 transfers the original spatial network vector (i.e., line) data into points. The point/attribute assignment program 140 assigns attributes to each point from the original network vector data. The grid generator program 145 applies a grid to the data and associates point data to cells in the grid. The weight assignment program 150 assigns a weight to each point. The density analysis/surface mapping program 155 calculates the number of points within each cell in the grid. The interdependency analysis program 160 compares the points of two networks to each other. The failure simulation program 165 and the disjoint path analysis program 170 analyze network effects and how infrastructure in one cell is spatially related to infrastructure in other cells. This embodiment analyzes a spatial network using a GIS 130. Spatial networks include any network that has a geographic reference to it, and can be presented in a coordinate system. Of course, other types of logical networks can be analyzed using any system for characterizing the network.

The system also includes a user interface 175, which can generate a 3-D vulnerability topology map 180, a vulnerability heat map 185, a statistical and numeric output map 190, or a disjoint path visualization heat map 195. In the 3-D vulnerability topology map 180, x and y represent the position on a two-dimensional axis in which the map lies, and z represents the height and indicates the level of network density or vulnerability depending on interpretation. The vulnerability heat map 185 presents variation in cell value with different colors (i.e., high values could be red fading to blue as values decreased), much like a choropleth map. The statistical and numeric output map 190 presents actual mathematical values calculated for each cell as non-visual output. The disjoint path visualization heat map 195 presents routing alternatives between two or more discrete points in the network, while also showing areas of the network that are vulnerable. Using the example above of a heat map fading from red to blue, the disjoint path heat map would illustrate alternative routes that avoided red (i.e., vulnerable) areas.

The line data can comprise, but is not limited to: satellite imagery data; or digitized map data; or any combination thereof. The network data can comprise, but is not limited to: static network data; dynamic network data; satellite network data; telecommunication data; marketing data; demographic data; business data; right-of-way routing data; or regional location data; or any combination thereof. The telecommunication data can comprise, but is not limited to: metropolitan area fiber data; long haul fiber data; co-location facilities data; internet exchanges data; wireless tower data; wire center data; undersea cables data; undersea cable landings data; or data center data; or any combination thereof. The right-of-way routing data can comprise, but is not limited to: gas pipeline data; oil pipeline data; highway data; rail data; or electric power transmission lines data; or any combination thereof. The static network data can comprise, but is not limited to: ip network data; or network topology data; or any combination thereof. The dynamic network data can comprise, but is not limited to network traffic data. The regional location data can comprise, but is not limited to: continent information; nation information; state information; county information; zip code information; census block information; census track information; time information; metropolitan information; or functional information; or any combination thereof. The functional information is defined by using, for example, but not limited to: a formula; a federal reserve bank region; a trade zone; a census region; or a monetary region; or any combination thereof.

The network data can be obtained by, for example, but not limited to: purchasing data; manually constructing data; mining data from external sources; probing networks; tracing networks; accessing proprietary data; or digitizing hard copy data; or any combination thereof.

Method

Figure 3:
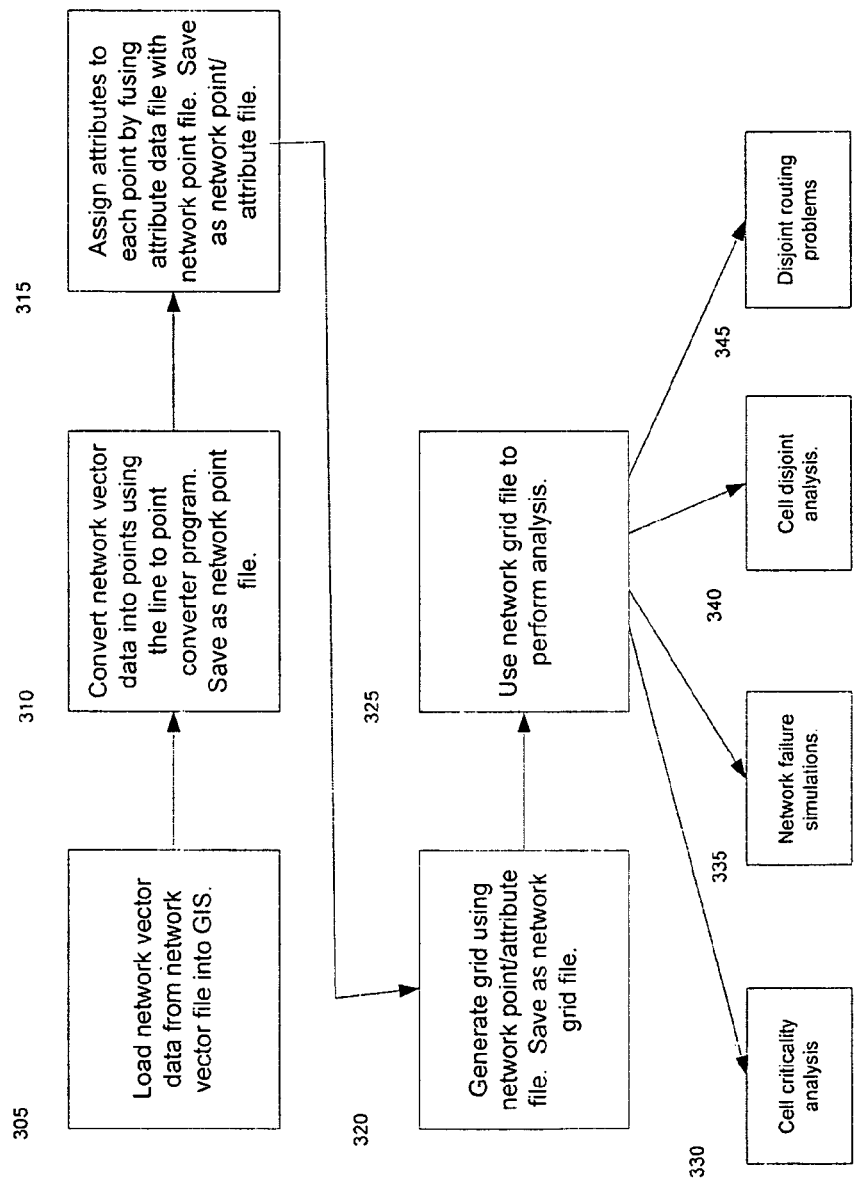
FIG. 3 illustrates a method for mapping and analyzing a network, according to one embodiment of the present invention.

FIG. 3 illustrates a method for mapping and analyzing a network, according to one embodiment of the present invention. In step 305, the spatial network line (i.e., vector) data is loaded from the network line file into the GIS 130. In step 310, the network line data is converted into points using the line to point converter program 135, and is saved as a network point file 115. In order to convert the network line data into point data a script is loaded to execute this function. When the line data is converted to points, parameters can be set by the user (e.g., the total number of points the user wants created, the distance between consecutive points, etc.). As the number of points becomes higher, the analysis becomes more granular, but also more computationally taxing.

In step 315, attributes are assigned to each point by fusing the attribute data file with the network point file, creating a network point/attribute file. The attribute data is derived from the original network. The attribute data allows each point to have its own weight (e.g., capacity, diameter, traffic, voltage, bandwidth, etc.) In step 320, a network grid is integrated with the network point/attribute file. The result is saved as a network grid file. The network grid encompasses the area of interest. A variety of scripts are available to create a grid overlay. The size of the grid cell can be set in accordance with the desired granularity of results. Grid size can range from a few meters to several kilometers, or higher, allowing a wide variety of scales to be achieved.

Figure 4:
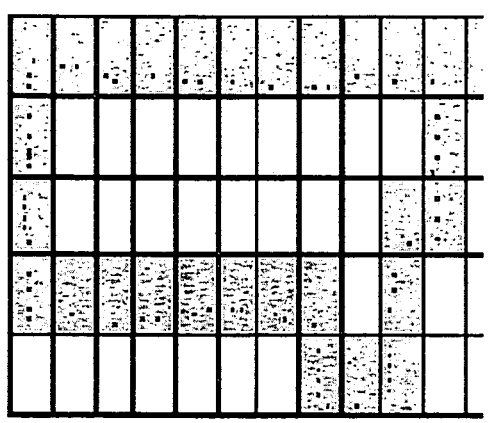

In step 325, now that points and a grid have been created, calculations using the points and the grid, saved in the network grid file, are used to perform different types of analyses (e.g., vulnerability analysis) on the network. For example, as illustrated in FIG. 4, within each cell of the grid, computations can be made based on the points contained within each cell. Thus, starting with the first cell in the upper left hand corner, and numbering each cell moving from left to the right, the resulting tables counting the points in each cell would be shown in FIG. 5.

In step 330, calculations regarding cell criticality, including ranking of cell criticality, can be made. In step 335, information from step 330 can be utilized to perform network failure simulations. In step 340, cell disjoint analysis can be performed. In step 345, genetic algorithms can be used to solve multicriteria disjoint routing problems. Of course, any one of steps 330-345 can be performed, or any combination thereof.

Measuring the Criticality of Cells

The criticality of cells can be measured in a number of ways, including, but not limited to: a density analysis, a weighted density analysis, an interdependency analysis, a choke-point analysis, or any combination of multiplying, adding, dividing, normalizing, logging, powering, or any other mathematical or statistical operation to the points of one or more networks in a grid cell.

Density Analysis. In a density analysis, the number of points within each cell is calculated, and is assigned to each cell. The numeric value of the grid cell signifies the relative concentration of network resources in a specified geographic area. This allows the identification of areas with low levels of geographic diversity but high levels of network infrastructure, which could be bottlenecks or points of vulnerability.

Figure 6:
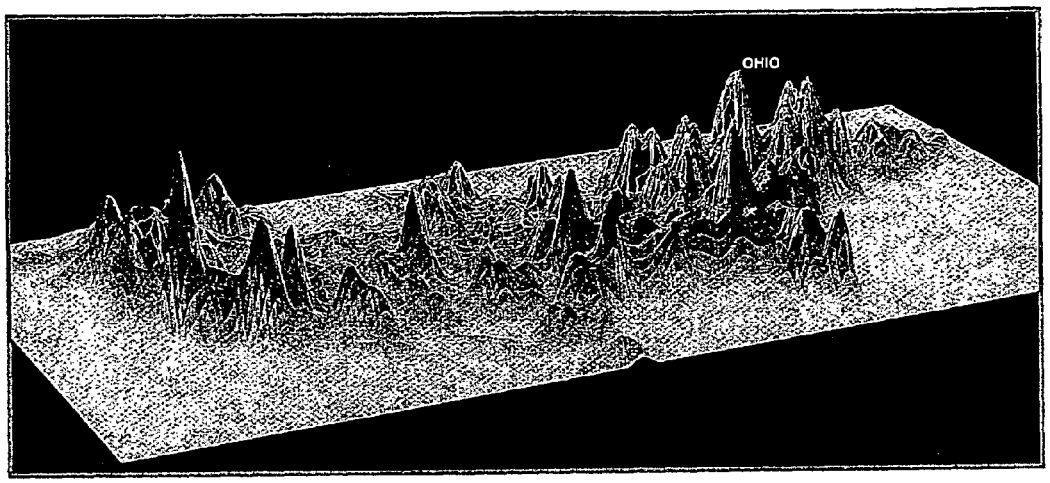
FIG. 6 illustrates an example of a density analysis, according to one embodiment of the present invention.

For example, as illustrated in FIG. 6, a density analysis of the electric power grid illustrates that the highest density of electric transmission lines with the least amount of diversity coincides with the area in Ohio that has been named as the origin of the Northeast Blackout in August of 2003.

These results can be presented visually in a variety of ways. The value of each grid cell can be assigned a z-value in accordance with its calculated value. The z-values of all the grid cells can then be plotted as a three dimensional map where height indicates the level of network density or vulnerability depending on interpretation. Further, these three-dimensional maps can be animated and a fly through provided. The results can also be presented as a choropleth map where different colors signify the calculated value of the grid cell. The end result can be a heat map of network density or vulnerability.

Weighted Density Analysis. Unlike traditional matrix methods, the weighted density analysis approach allows for the inclusion of weights for very large and complex networks. Along with calculating the number of points in each cell, the weight of each point can be considered as well. The first possible function is adding together the sum of weights for all points in a cell. Second, a ratio can be computed of the total weight of each cell divided by the number of points in each cell. The values within each cell can be added, subtracted, logged, powered, normalized, divided, or multiplied depending on the desires of the user. The same visualization techniques outlined above under the density analysis can be used here as well.

Figure 7:
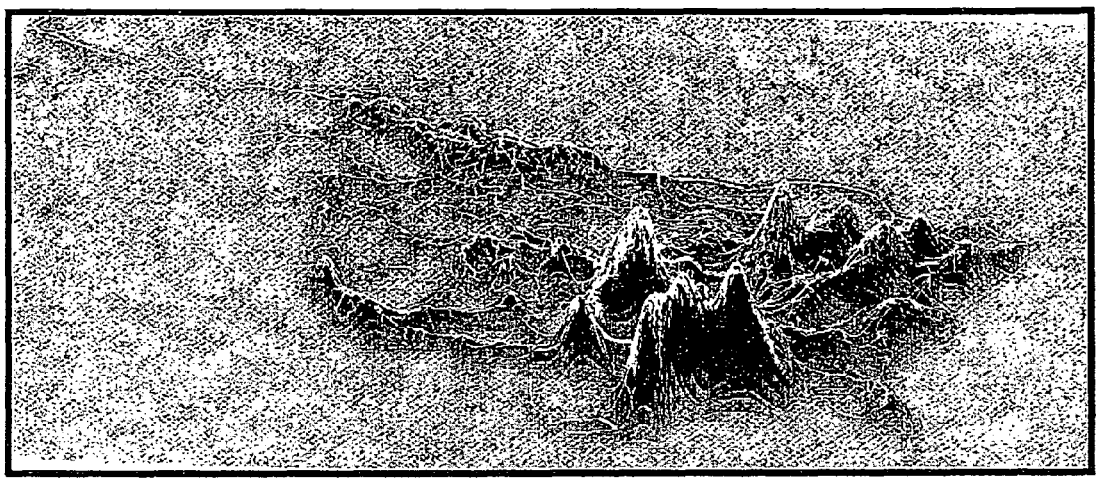
FIGS. 7-9 illustrate the weighted density analysis, according to one embodiment of the present invention.
Figure 8:
Figure 9:
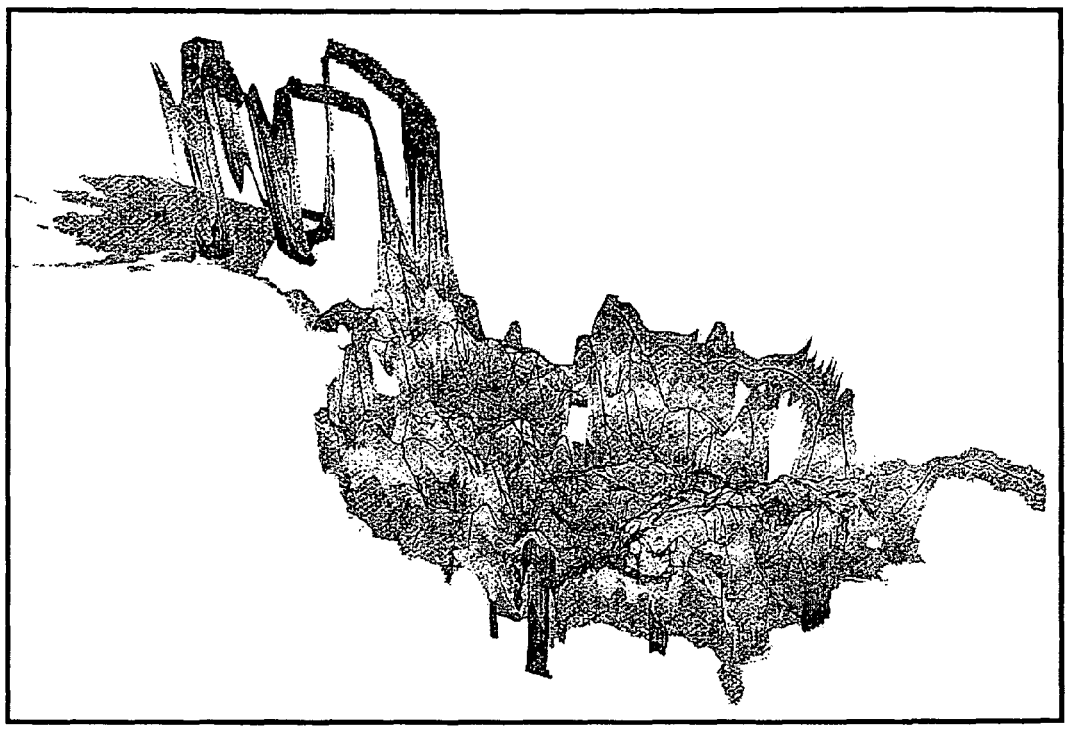

For example, FIGS. 7-8 illustrate a weighted density analysis (FIG. 8) and a regular density analysis (FIG. 7) for the North America gas pipeline network. In addition to looking at the number of points in a cell and the capacity of points in those cells, algorithms can be run where these two variables are used in calculations. For example, the capacity of a cell could be divided by the density of a cell to discover areas that have more capacity than density (i.e., diversity), identifying, for example, bottlenecks in the network. The output of such an approach is illustrated in FIG. 9 for the North American gas pipeline network.

Interdependency Analysis. In addition to analyzing single network infrastructures, multiple networks can be studied to determine their spatial interdependency. The same procedures as above are followed except two or more networks are loaded into the GIS 130. Line data in each network are separately converted into points and assigned attributes from their respective databases. Once this has been accomplished a grid can be employed and calculations achieved. Specifically by analyzing two or more networks concurrently one can identify specific geographic locations where there is high density or vulnerability for both, a spatial interdependency. This can be done in a variety of combinations integrating the number of points and a variety of weights then adding, subtracting, logging, powering, normalizing, dividing, or multiplying for all possible network interdependency sequences. This can be visualized utilizing the means outlined above in the density analysis section.

Figure 10:
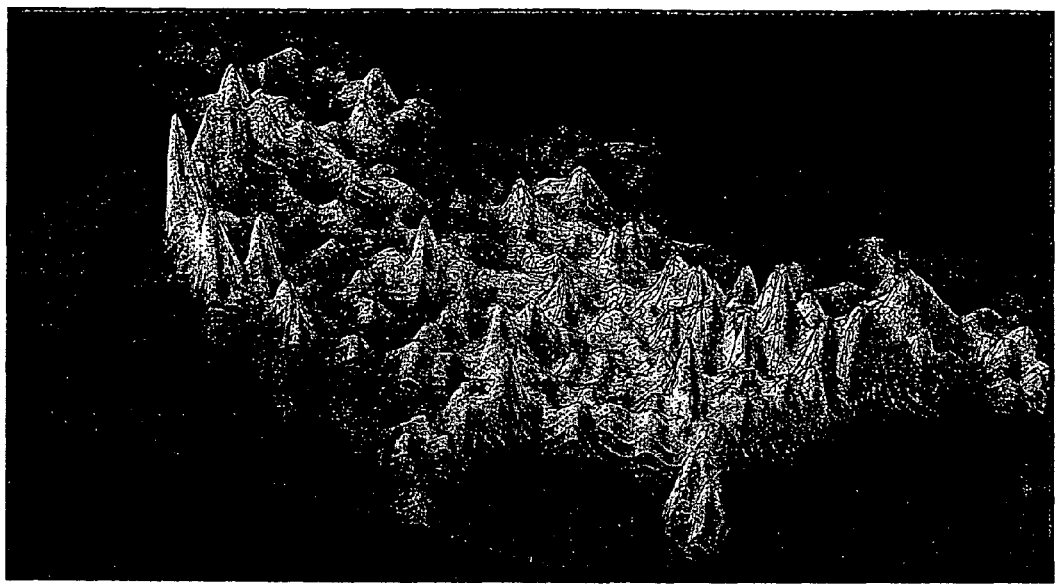
FIGS. 10-11 illustrate examples of an interdependency analysis, according to one embodiment of the present invention.

For example, FIG. 10 is a grid density analysis that combines the fiber and power grids to analyze where there are common geographic interdependencies between the two infrastructures.

Along with analyzing the interdependencies between two or more networks, an analysis can be constructed that illustrates spatial interdependencies between a network and other fixed objects. For example, the spatial interdependence between bridges and telecommunication fibers or dams and power transmission lines can be studied. This is accomplished by calculating the intersection of points with the fixed object represented by polygons. This can be visualized utilizing the means outlined above in the density analysis section.

Figure 11:
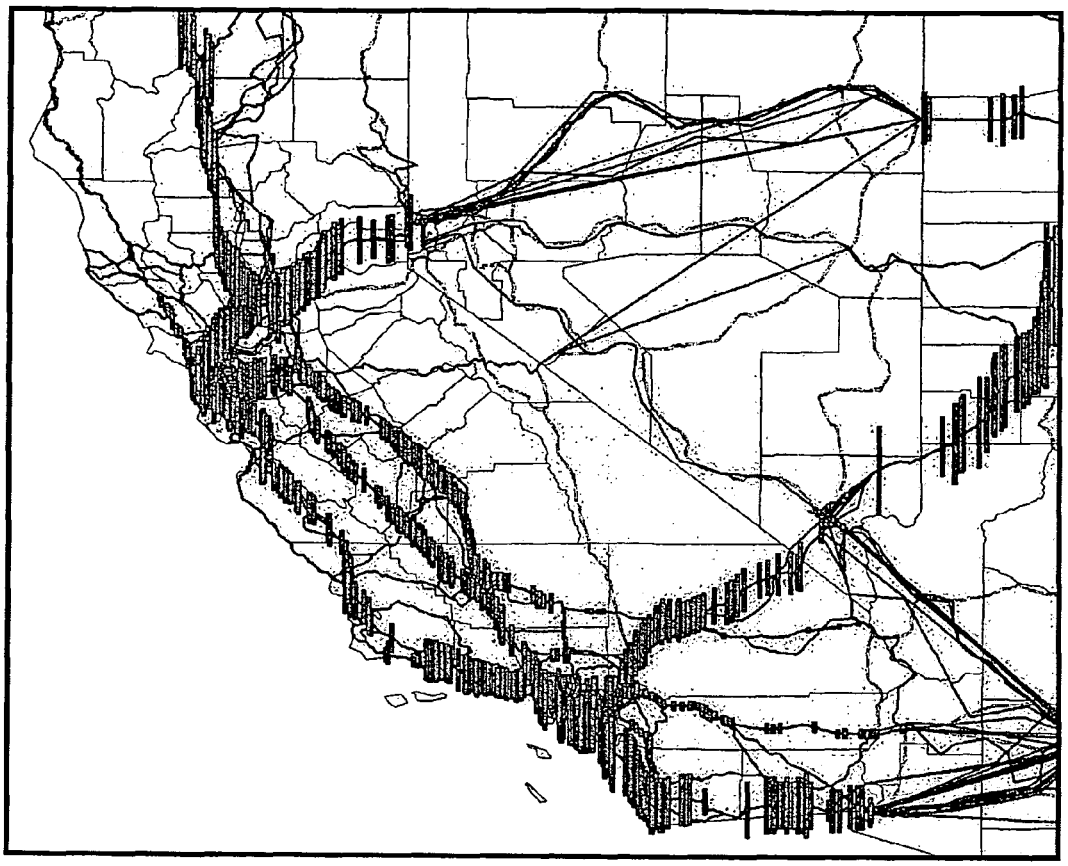

For example, FIG. 11 illustrates polygons that are critical bridges that intersect with fiber optic cable. The more fiber that interests with the bridge, the taller the corresponding red bar.

Choke-Point Analysis Using Spatial Statistics. One of the shortcomings of the raster-based approach is that it ignores network effects or how infrastructure in one cell is spatially related to that in other cells. This is an important aspect to consider when defining the criticality of a cell or part of a network (i.e., the implications of destroying the infrastructure in a high-density cell that is geographically well-connected to several other cells in an area could be quite severe but the effects would not be as damaging if this same cell despite its density were geographically isolated).

Figure 13:
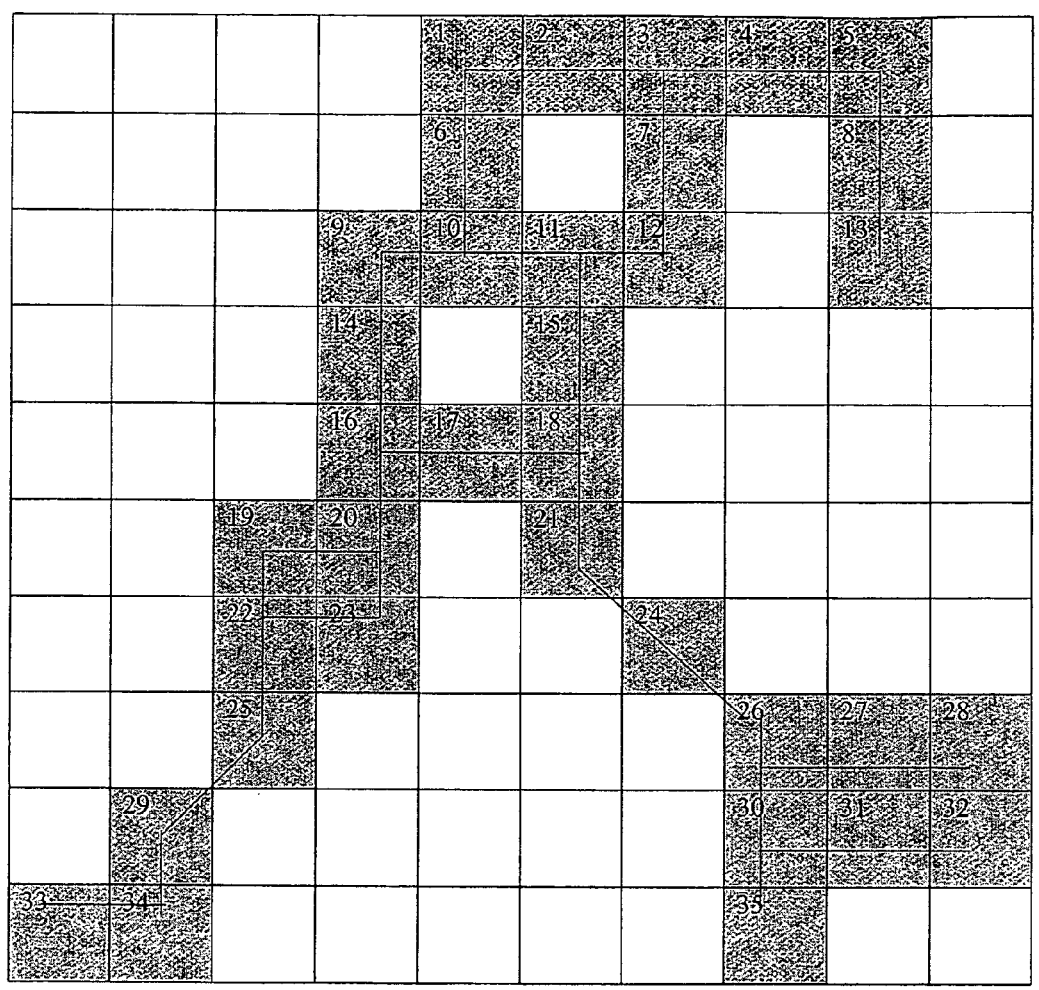

To use spatial statistics it is necessary to define a contiguity matrix that describes how cells are located in space vis-à-vis one another based on some rule for adjacency. FIG. 12 illustrates a prototype network with a 10×10 grid overlay and reference numbers. The lines represent the network and the numbers in the cells are references for a contiguity matrix. The network is broken down into 35 cells by overlaying a 10×10 grid, extracting only those cells that contain sections of the network. Using the extracted cells, a 35×35 contiguity matrix is generated using the following rule: a cell is adjacent to another if it lies directly above, below, to the right, to the left or at any of the four diagonal positions. For any two pairs of cells, a 1 in the matrix indicates adjacency and a 0 non-adjacency. FIG. 13 illustrates the contiguity matrix generated for the prototype network. Each cell can also be assigned a weight, or non-zero number, that reflects some attribute of the network contained in that cell (e.g., capacity or density).

Some of the statistics available for identifying and measuring the criticality of cells based on adjacency relationships include: degree, betweenness, closeness, entropy, and weighted entropy. The degree of a cell is defined as the number of cells that are directly adjacent to it, as defined in the adjacency matrix The degree of a cell is a measure of the local connectedness of a cell, or portion of a network. Betweenness and closeness are two indicators derived from social network theory, and they are used to characterize the centrality of a cell in relation to the rest of the network. The closeness centrality of a cell is based on the average minimum distance of that cell to all other cells in the network. Betweenness centrality measures the extent to which a cell is an intermediate location for the minimum paths associated with all other pairs of cells. Entropy is a measure of disorder in a network based on the graph structure, where, for a particular cell, the value ranges from 0 to 1. A weighted entropy indicator is also calculated for each cell defined by the product of its entropy and capacity.

Cell Disjoint Path Analysis

A cell disjoint path analysis analyzes network effects and how infrastructure in one cell is spatially related to infrastructure in other cells. Two or more paths are completely disjoint if no cells are shared in the paths between two or more locations. Thus, the more cells that are shared by a plural paths, the less disjoint the paths are. The more that multiple paths are disjoint, the more resilient the network is to failures, since there are fewer shared cells in which failure can cause multiple paths to fail. If the connection of two locations is critical, then knowing how disjoint the paths are that connect them is crucial to understanding the resiliency and reliability of a network connecting them.

Figure 14:
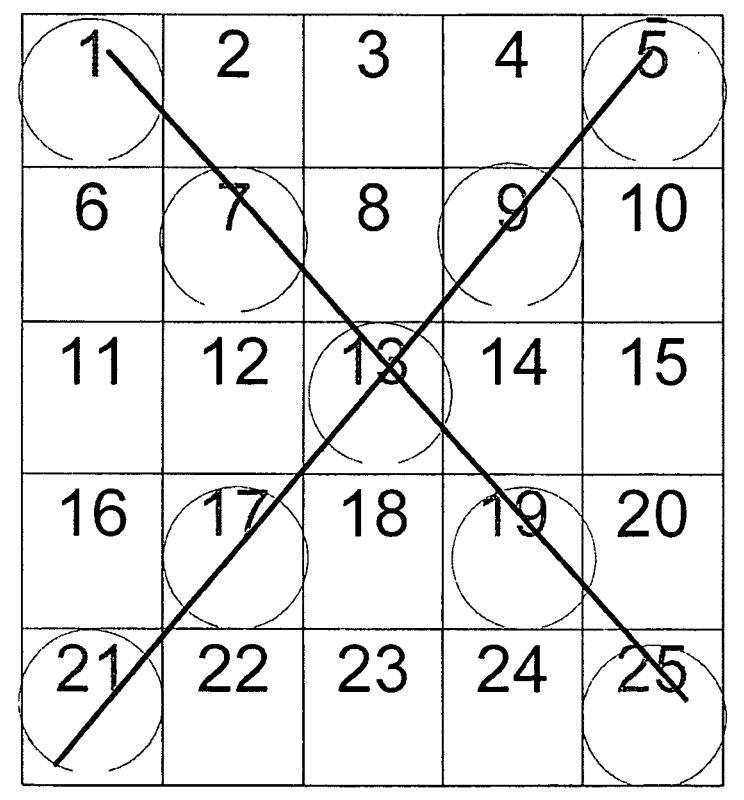

FIG. 14 displays a grid laid over a network line file (represented by the diagonal lines). The cells are assigned numbers. The cells containing a network point have a circle in the cell. Thus, the cells containing a network point are cells 1, 5, 7, 9, 13, 17, 19, 21, and 25. Attributes can also be assigned to the points based on a variety of factors. A cell adjacency list (i.e., connectivity edge list) can be created. For example, the cell adjacency list for the network in FIG. 14 is:

1,7
7,13
13,19
19,25
21,17
17,13
13,9
9,5

Once the cell adjacency list has been created, the number of disjoint paths between two nodes can be calculated. For example, in FIG. 14, if a node was located in each of cell 25 and cell 5, there is only one path between 25 and 5: 25, 19, 13, 9, 5. Thus, if any cell in that path failed, the nodes in cells 25 and 5 would no longer be able to communicate with each other, and the network would fail.

Figure 15:
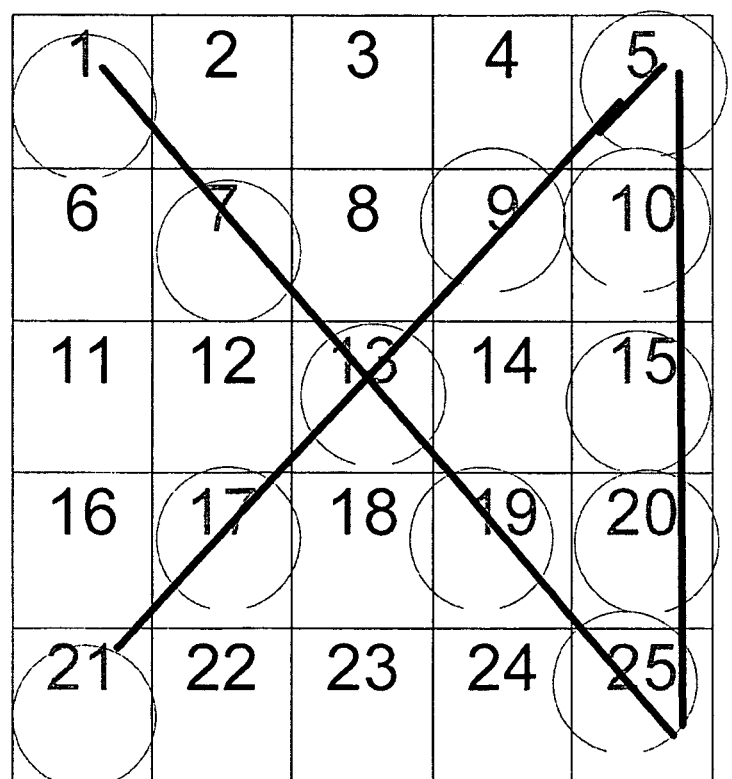

FIG. 15 illustrates the addition of another link to the same network. If an additional link, represented by the line covering 5, 10, 15, 20, and 25, were added to the network, the calculation would be different. With the addition of the new network link, there is now a second path between the node in cell 25 and 5 with the path—25, 20, 15, 10, and 5 (represented by the vertical line). The second link adds a second route to connect the nodes in cells 25 and 5. Thus, if a cell fails in the first path, there is now a second path to connect the two nodes together. This in turn doubles the resiliency of the network because there are now two paths instead of just one path to connect the two nodes. Furthermore, the two links are completely disjoint in that the two links do not share any cells. Failure in any one cell cannot cause both links to fail.

Figure 16:
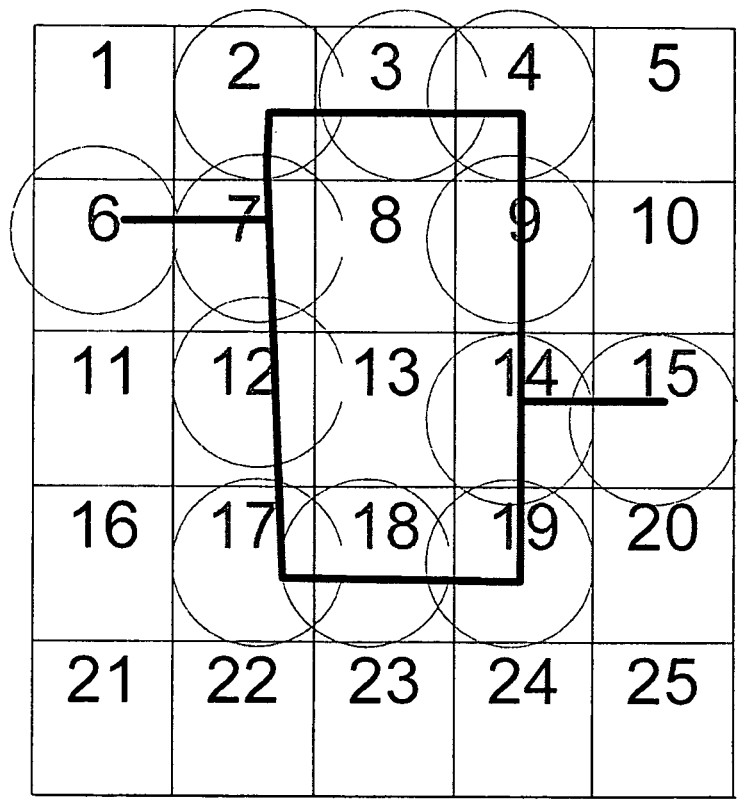

FIG. 16 illustrates a ring topology (including a ring of cells 2, 3, 4, 9, 14, 19, 18, 17, 12, 7, and back to 2) with two laterals (6 and 15) to respective clients. Ring topology is typical to telecommunication networks that are often laid in rings to provide two paths to customers. From the ring, customers are connected by laterals to the ring, as shown by cells 6 and 15. The cell adjacency list is:

6,7
7,2
2,3
3,4
4,9
9,14
14,15
14,19
19,18
19,17
17,12
12,7

The nodes for the logical network would be cells 6 and 15, because these nodes are where laterals are laid to connect customers to the network. Customers would have a node in their location connected to the network ring by a lateral. The disjoint paths between these two cells are not as obvious, because cells 7 and 14 are needed for both possible paths between the two nodes. In such a case, the following equation can be used to calculate cell disjointness of the paths.

$$ED = 1 - \Sigma l_j / \Sigma l_i$$

where j is the sum over the common cells of the two paths, i is the sum over the cells of the two paths, ED is edge disjointness, $l_j$ is shared links or cells, and $l_i$ is unshared links or cells. For the example illustrated in FIG. 16, cells 7 and 14 are needed for both paths, and thus $l_j$ is 2. The total number of cells in the paths are 12, and thus $l_i$ is 12. Thus ED=1−(2/12) =0.833. Thus, the paths are 83.3% disjoint.

The more multiple paths between nodes are disjoint, the more resilient the network is, because there are fewer shared cells that could fail more than one path/route in the network. Network paths with a high level of disjointness pose a lower risk of failure than paths with low levels of disjointness. This approach allows the grid and its adjacent cells to be turned back into a network, and theoretical measures can be graphed and used for analysis in a traditional matrix. This allows for failure simulations to be performed as outlined in the next section.

Network Failure Simulations

The error tolerance and attack tolerance of a network or set of interrelated networks can be analyzed by using the rankings of cell criticality described above, removing them sequentially from the grid, and examining different properties of the network as they are removed. There are several properties that can be observed and some of these include diameter, average geodescic distance, the degree of balkanization, cohesion and distance fragmentation. Diameter is the maximum distance necessary to travel between two nodes in the network measured by the number of links that comprise the route and average geodescic distance is the average distance in links between all combinations of nodes in the network. The degree of balkanization is the number of subnetworks, or disconnected parts of the network, at any point in the simulation. Cohesion and distance fragmentation are measures of connectivity derived from social network theory.

Figure 17:
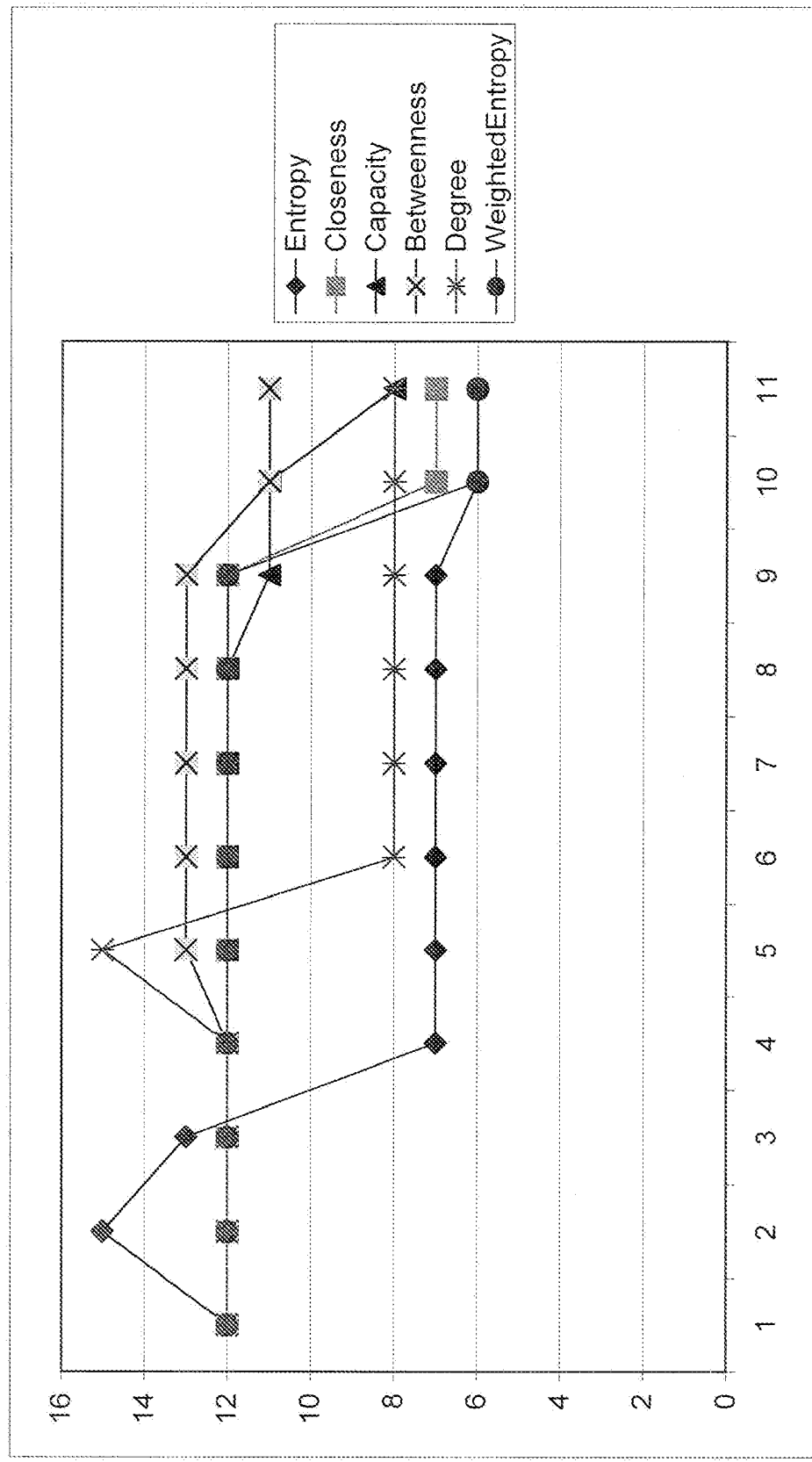
FIGS. 17-21 illustrate features of a network failure simulation, according to one embodiment of the present invention.
Figure 18:
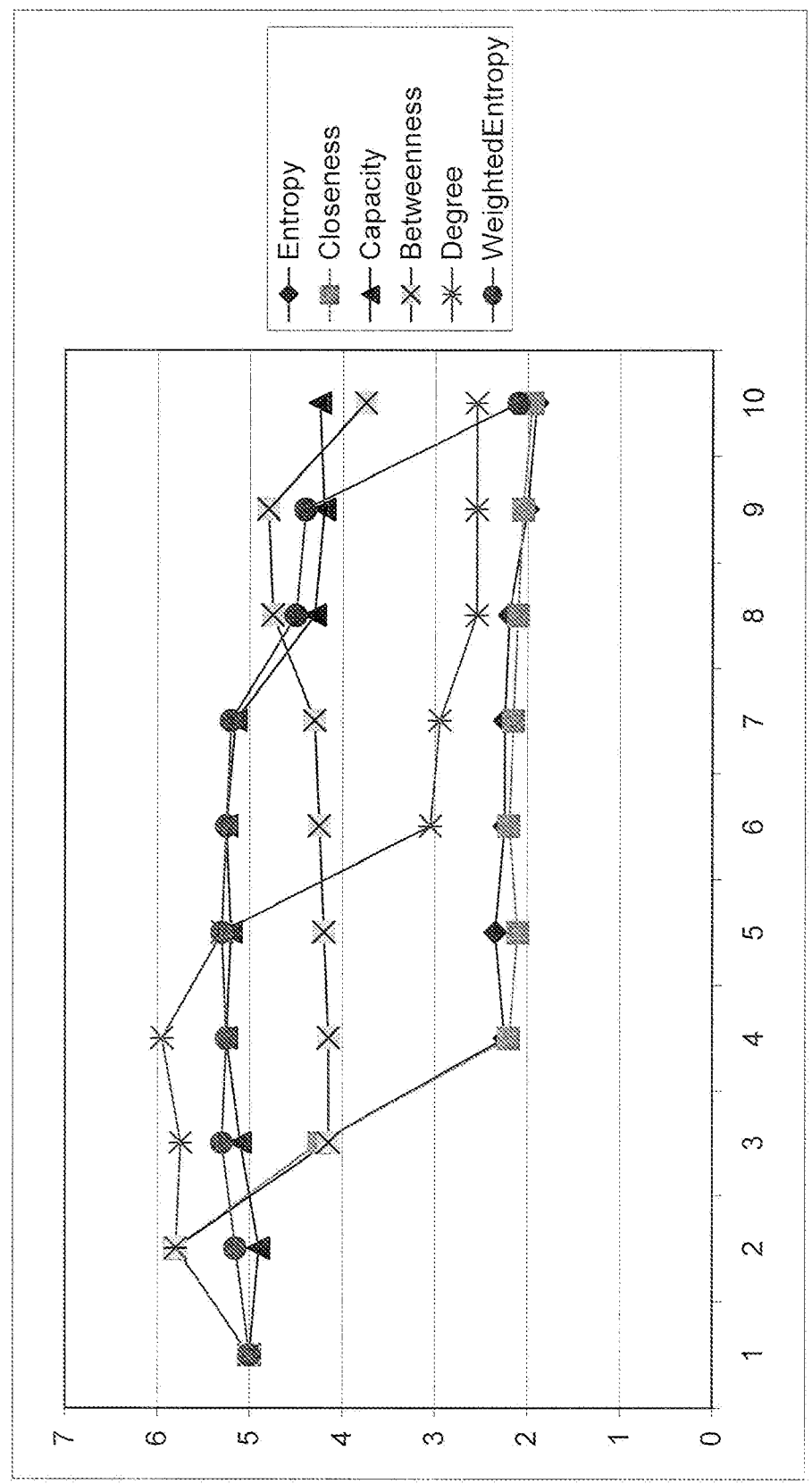
Figure 19:
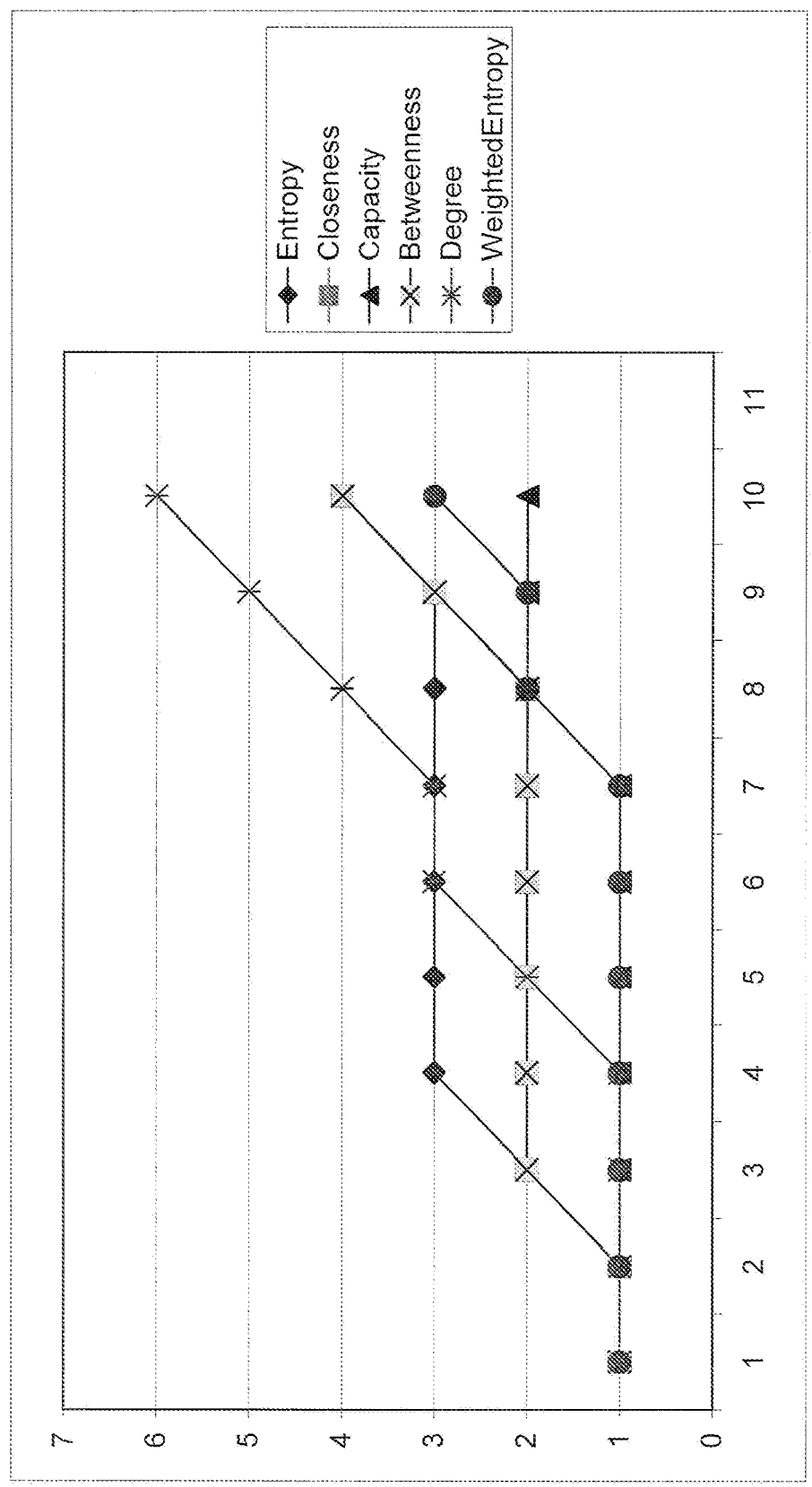
Figure 20:
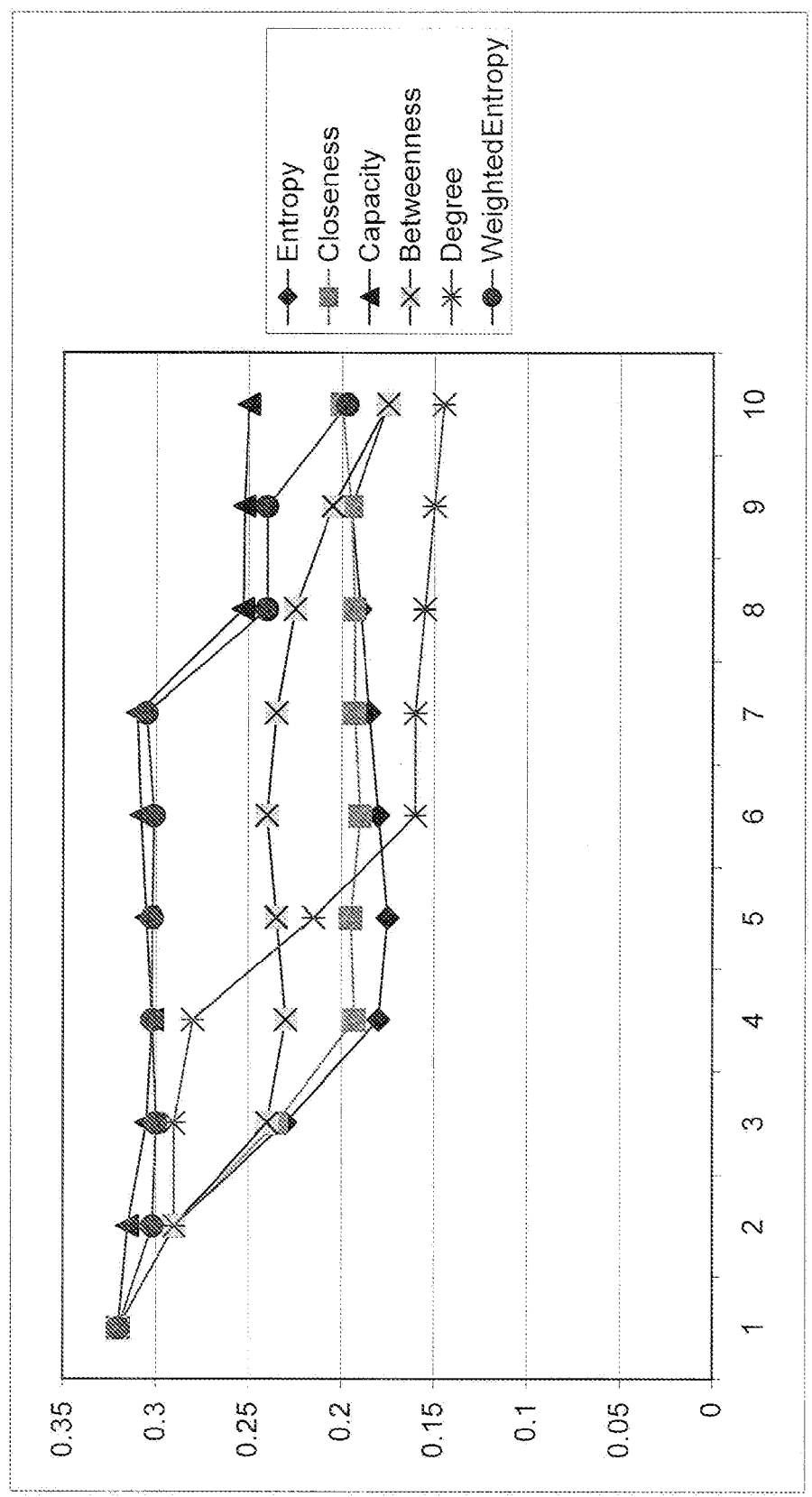
Figure 21:
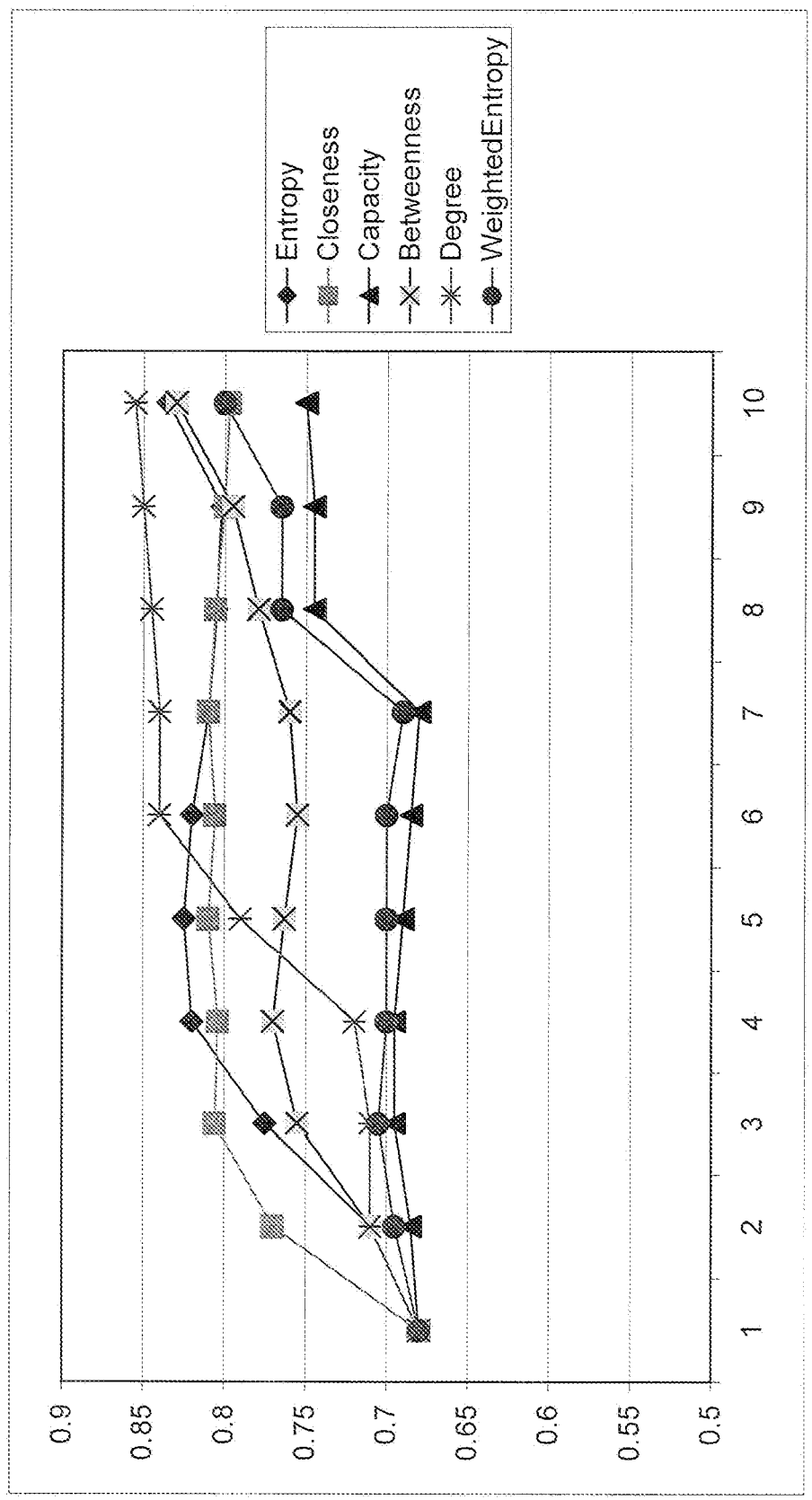

Cells are removed sequentially based on criticality and the degradation of the network observed. This is demonstrated using the prototype network shown in FIG. 12 and the measures of cell criticality described in the previous section. FIGS. 17-21 illustrate the results when, for each measure of criticality, the top ten most critical cells are removed in sequence. FIG. 17 illustrates the diameter. FIG. 18 represents the average geodescic distance. FIG. 19 illustrates Balkanization of the network. FIG. 20 illustrates cohesion. n terms of network resiliency. FIG. 21 illustrates distance fragmentation. The results of the simulations for the prototype network show that out of the six criticality indices used, degree appears to have the most immediate negative impact on all of the global properties examined. Entropy also has a strong negative impact, although the effects are more delayed.

CONCLUSION

While various embodiments of the present invention have been described above, it should be understood that they have been presented by way of example, and not limitation. It will be apparent to persons skilled in the relevant art(s) that various changes in form and detail can be made therein without departing from the spirit and scope of the present invention. Thus, the present invention should not be limited by any of the above-described exemplary embodiments.

In addition, it should be understood that the figures described above, which highlight the functionality and advantages of the present invention, are presented for example purposes only. The architecture of the present invention is sufficiently flexible and configurable, such that it may be utilized in ways other than that shown in the figures.

Further, the purpose of the Abstract is to enable the U.S. Patent and Trademark Office and the public generally, and especially the scientists, engineers and practitioners in the art who are not familiar with patent or legal terms or phraseology, to determine quickly from a cursory inspection the nature and essence of the technical disclosure of the application. The Abstract is not intended to be limiting as to the scope of the present invention in any way.

What is claimed is:

1. A computerized method for mapping a network, comprising:
    using a computer to convert network line data into point data for a network;
    using the computer to associate the point data with cells of a grid overlaying the network; and
    using the computer to analyze the network by determining the relationship of the point data to the cells of the grid.

2. The method of claim 1, wherein attribute data is assigned to the point data.

3. The method of claim 1, wherein a network is a spatial network.

4. The method of claim 1, wherein the analyzing comprises determining critical cells based on the association.

5. The method of claim 1, wherein the analyzing comprises determining the number of points in each of the cells.

6. The method of claim 1, wherein the analyzing comprises assigning a weight to each point of the point data.

7. The method of claim 6, further comprising determining the total weight of points in each of the cells.

8. The method of claim 1, further comprising:
    removing at least one cell from the grid; and
    examining the effect on the network caused by removing the at least one cell.

9. The method of claim 1, wherein the associating comprises:
    creating a second network based on the relationship of point data to cells.

10. The method of claim 9, further comprising:
    creating a cell adjacency list based on which cells are adjacent to each other; and
    determining disjoint paths between cells based on the cell adjacency list.

11. The method of claim 10, wherein disjointness of paths is calculated utilizing the ratio of the sum of the common cells of the paths divided by the sum of the cells of the paths.

12. The method of claim 1, wherein the line data comprises:
    satellite imagery data;
    digitized map data; or
    any combination of the above.

13. The method of claim 1, wherein the network data comprises;
    static network data;
    dynamic network data;
    satellite network data;
    telecommunication data;
    marketing data;
    demographic data;
    business data;
    right-of-way routing data; or
    regional location data; or
    any combination of the above.

14. The method of claim 13, wherein the telecommunication data comprises:

metropolitan area fiber data;
long haul fiber data;
co-location facilities data;
internet exchanges data;
wireless tower data;
wire center data;
undersea cables data;
undersea cable landings data; or
data center data; or
any combination of the above.

15. The method of claim 13, wherein the right-of-way routing data comprises:
gas pipeline data;
oil pipeline data;
highway data;
rail data; or
electric power transmission lines data; or
any combination of the above.

16. The method of claim 13, wherein the static network data comprises:
ip network data; or
network topology data; or
any combination of the above.

17. The method of claim 13, wherein the dynamic network data comprises network traffic data.

18. The method of claim 1, wherein the network data is obtained by:
purchasing data;
manually constructing data;
mining data from external sources;
probing networks;
tracing networks;
accessing proprietary data; or
digitizing hard copy data; or
any combination of the above.

19. The method of claim 13, wherein the regional location data includes at least one of:
continent information;
nation information;
state information;
county information;
zip code information;
census block information;
census track information;
time information;
metropolitan information; or
functional information; or
any combination of the above.

20. The method of claim 19, wherein the functional information is defined using at least one of:
a formula;
a federal reserve bank region;
a trade zone;
a census region; or
a monetary region; or
any combination of the above.

21. A computerized system for mapping a network, comprising:
a server coupled to a network;
a database accessible by the server; and
an application coupled to the server, the application configured for:
converting network line data into point data for a network;
associating the point data with cells of a grid overlaying the network; and
analyzing the network by determining the relationship of the point data to the cells of the grid.

* * * * *